United States Patent
Speicher et al.

(10) Patent No.: US 9,774,597 B2
(45) Date of Patent: Sep. 26, 2017

(54) CONFIGURABLE ELECTRONIC-DEVICE SECURITY LOCKING

(71) Applicant: Microsoft Technology Licensing, LLC., Redmond, WA (US)

(72) Inventors: Stephen Speicher, Redmond, WA (US); Ananda Sarkar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 14/562,574

(22) Filed: Dec. 5, 2014

(65) Prior Publication Data
US 2016/0164865 A1 Jun. 9, 2016

(51) Int. Cl.
*H04L 9/32* (2006.01)
*H04L 29/06* (2006.01)
*H04W 12/06* (2009.01)
*G06F 21/31* (2013.01)
*H04W 12/08* (2009.01)

(52) U.S. Cl.
CPC ........ *H04L 63/0861* (2013.01); *G06F 21/316* (2013.01); *H04L 63/0876* (2013.01); *H04L 63/102* (2013.01); *H04W 12/06* (2013.01); *H04W 12/08* (2013.01)

(58) Field of Classification Search
CPC ..... H04L 63/08; H04L 63/20; H04L 63/0861; G06F 21/31; G06F 21/32; G06F 21/44
USPC ............ 726/2–6, 17, 21; 713/168, 182, 186; 382/115–118, 124
See application file for complete search history.

(56) References Cited

U.S. PATENT DOCUMENTS

| | | | |
|---|---|---|---|
| 6,182,076 B1 * | 1/2001 | Yu | G06F 21/32 707/758 |
| 7,487,089 B2 * | 2/2009 | Mozer | G06F 21/32 382/116 |
| 7,685,629 B1 * | 3/2010 | White | G06Q 20/3674 705/67 |
| 8,646,060 B1 | 2/2014 | Ben Ayed | |

(Continued)

OTHER PUBLICATIONS

Dachis, Adam "How to Automatically Unlock Your Gadgets Without a Password", retrieved on Sep. 24, 2014 at <<http://lifehacker.com/how-to-make-your-smartphone-automatically-unlock-your-s-510592193>>, Jun. 3, 2013, 10 pages.

(Continued)

*Primary Examiner* — Hosuk Song
(74) *Attorney, Agent, or Firm* — Merchant & Gould P.C.

(57) ABSTRACT

An interface of an electronic device may be locked in accordance with an authorization confidence level indicating a likelihood that the electronic device is in the possession of an authorized user of the electronic device. Multiple signals may be detected using one or more sensors of an electronic device. The authorization confidence level may be automatically determined using the detected signals. The electronic device may be configured to have a security timeout based at least in part on the authorization confidence level. In some examples, collection(s) of signals may be detected using one or more sensors of an electronic device. A confidence history may be updated using the collection(s) of signals. In response to a match of the confidence history to a stored locking condition, a user interface of the electronic device may be locked.

20 Claims, 7 Drawing Sheets

(56) References Cited

U.S. PATENT DOCUMENTS

| | | | | |
|---|---|---|---|---|
| 8,826,030 | B2* | 9/2014 | White | G06F 21/32 |
| | | | | 713/168 |
| 8,832,798 | B2* | 9/2014 | Thavasi | G06F 21/31 |
| | | | | 726/4 |
| 9,286,482 | B1* | 3/2016 | Dumont | G06F 21/62 |
| 2011/0105073 | A1 | 5/2011 | Hassan et al. | |
| 2013/0212702 | A1 | 8/2013 | Niglio et al. | |
| 2014/0038564 | A1 | 2/2014 | Mahaffey et al. | |
| 2014/0047510 | A1 | 2/2014 | Belton et al. | |
| 2014/0068094 | A1 | 3/2014 | Burch et al. | |
| 2014/0123273 | A1 | 5/2014 | Matus | |
| 2014/0155029 | A1 | 6/2014 | Kolaks et al. | |
| 2014/0282877 | A1* | 9/2014 | Mahaffey | H04L 63/0853 |
| | | | | 726/3 |

OTHER PUBLICATIONS

Hirashima, Ben "SkipLock Wifi Bluetooth Unlock", retrieved on Sep. 24, 2014 at <<https://play.google.com/store/apps/details?id=com.benhirashima.skiplock&hl=en>>, Google Playstore, May 20, 2014, 2 pages.

Nazarian, Robert "How to automatically disable Android's security lock screen when connected to your home Wi-Fi; Bluetooth device or by location", retrieved on Sep. 24, 2014 at <<http://www.talkandroid.com/guides/beginner/how-to-automatically-disable-androids-security-lock-screen-when-connected-to-your-home-wifi-bluetooth-device-or-by-location/>>, Talk Android, Oct. 1, 2013, 9 pages.

Nickinson, Phil "Trusted Bluetooth devices: A must-have for every smartphone going forward" retrieved on Sep. 24, 2014 at <<http://www.androidcentral.com/trusted-bluetooth-devices-must-have-every-smartphone-going-forward>>, Android Central, Sep. 11, 2013, 11 pages.

Popescu, George "Automatically Lock and Unlock Your Mac Using Portable Devices", retrieved on Sep. 24, 2014 at <<http://www.softpedia.com/reviews/mac/TokenLock-Review-445627.shtml>>, Softpedia, Jun. 12, 2014, 3 pages.

\* cited by examiner

CONFIGURABLE ELECTRONIC-DEVICE SECURITY LOCKING

BACKGROUND

Electronic devices such as smartphones, tablets, and computers can store a large amount of personal information about authorized users of such devices. In various examples, a smartphone may store the authorized user's credentials on email services, backup services, or Web sites. Electronic devices may also include the authorized user's personal phonebook and/or pictures of the authorized user's family members. To inhibit misuse of this personal information, such electronic devices generally lock after they are inactive for a certain amount of time. When locked, the information on the electronic device is inaccessible until unlocked, e.g., by entering a password or personal identification number (PIN).

Electronic devices are generally configured to lock after a fixed amount of time of nonuse. This may inconvenience the authorized user, who may be required to unlock an electronic device after only a brief period of attention to something other than the electronic device.

SUMMARY

This disclosure describes systems and methods for configuring security locking timeouts of electronic devices or for locking user interfaces of electronic devices. Techniques described herein may store distinguishing data representing user(s) or situation(s) relevant to the security of the electronic device, e.g., data representing typical behaviors of an authorized user of the electronic device. In at least one example, multiple signals may be detected using sensors of an electronic device. An authorization confidence level may be determined using the signals and a security timeout may be configured based at least in part on the authorization confidence level. An example method may include updating a confidence history using the detected signals and, in response to the confidence history matching a stored locking condition, locking a user interface of the electronic device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
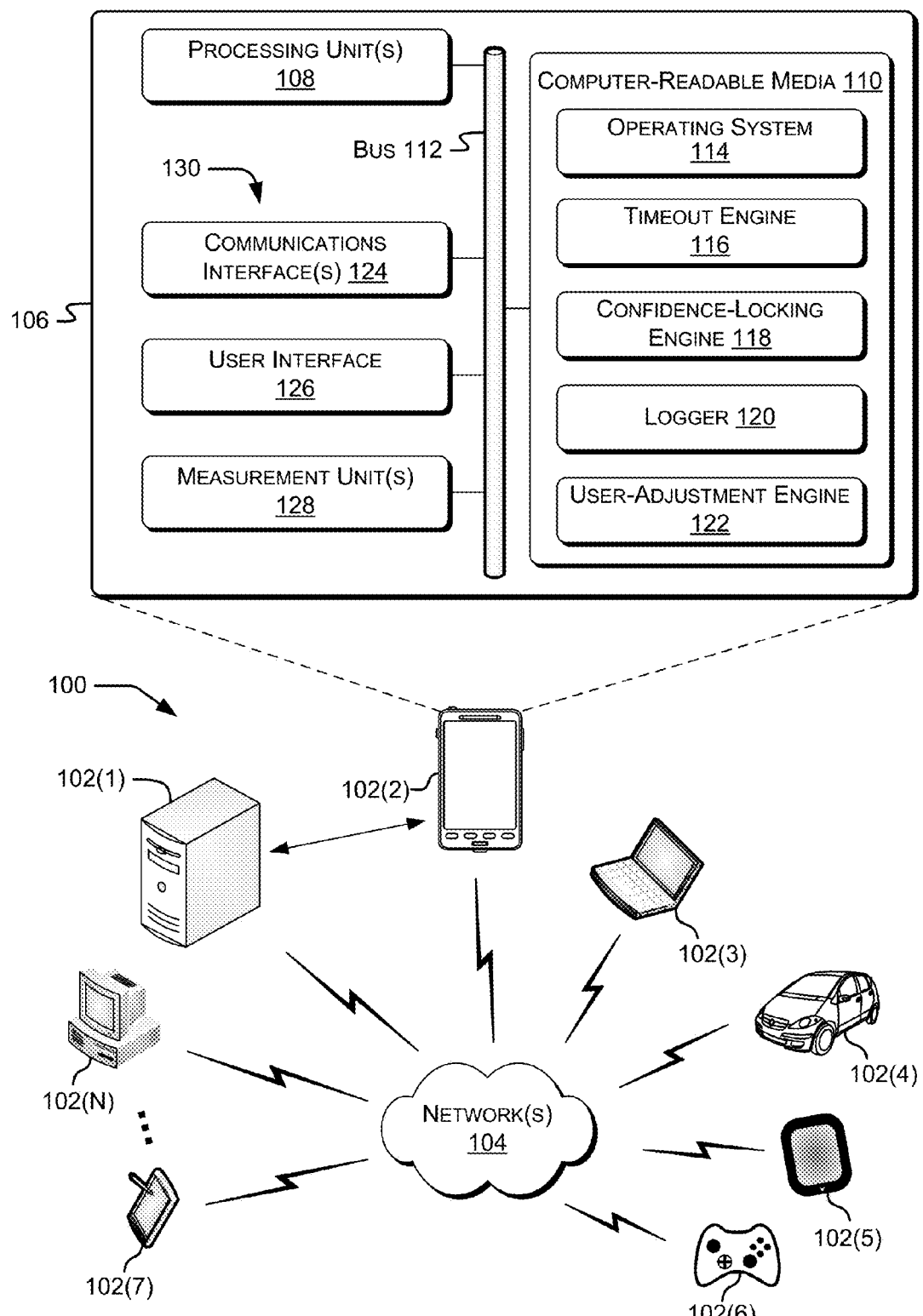
FIG. 1 is a block diagram depicting an example environment for implementing security-timeout adjustment or locking as described herein.

Examples described herein provide techniques and constructs to improve security and usability of electronic devices by controlling the timing of device locking. Adjusting timeouts or locking based on conditions may provide improved convenience to an authorized user without reducing security of the authorized user's personal information. Locking based on conditions may provide improved security in the face of unexpected threats to an electronic device (e.g., theft).

Examples described herein control the timing of device locking depending on whether an electronic device is under the control of an authorized user. As long as an electronic device remains under such control, the locking timeout may be extended. In some examples, once an authorized user unlocks an electronic device, that device may remain unlocked as long as it is on that authorized user's person. Once an electronic device passes out of the control of an authorized user, the locking timeout may be reduced or eliminated (e.g., to lock the device immediately).

As used herein, use of the term "authorized user" does not restrict the number of authorized user(s) of a particular electronic device. For example, a single electronic device may have multiple authorized users with respective, different accounts. Moreover, a single authorized user may have one or more electronic device(s). As described herein, an electronic device is "under control of" an authorized user when that electronic device is in the possession or on the person of that authorized user, in proximity to the authorized user, under supervision by the authorized user, being used by another at the direction of the authorized user, and/or in a location over which the authorized user exercises dominion (e.g., the authorized user's residence, office, or vehicle). An electronic device that is out of the control of an authorized user may be under the control of an unauthorized user, or may not be under the control of any person, e.g., as is the case for electronic devices that have been lost or mislaid.

Various prior security schemes have extended the inactivity-locking timeout based on criteria such as location of an electronic device or whether network communications may be established with a predetermined remote computer. However, this extending may reduce security by increasing the time window during which a thief may steal or otherwise access the electronic device. Accordingly, increased convenience of the authorized user in such schemes comes at the expense of reduced security of the electronic device.

In some examples, the timing of locking of the electronic device is controlled based on who (if anyone) has control (e.g., possession) of the electronic device, and whether or not the person controlling the electronic device is an authorized user. Some algorithms for configuring a security timeout for an electronic device as described herein may detect multiple signals using one or more sensors of the electronic device. An authorization confidence level may be determined using the detected signals. The authorization confidence level may indicate whether the electronic device is under the control of an authorized user of the electronic device. The security timeout may then be configured based at least in part on the authorization confidence level. A user interface of the electronic device may be locked in response to inactivity of the user interface for the security timeout. Stored distinguishing data can be used with the detected signals in determining the authorization confidence level. Distinguishing data can represent, e.g., typical behaviors or situations relating to authorized user(s), unauthorized user(s), secure location(s) or situation(s), or insecure location(s) or situation(s).

When the authorization confidence level indicates a high probability of control of the electronic device by the authorized user, the timeout may be extended, e.g., indefinitely. This may provide increased convenience and usability to the authorized user. When the authorization confidence level indicates a low probability of control of the electronic device by the authorized user, the timeout may be reduced or eliminated, as noted above. A technical effect of various examples is to detect the state of the electronic device or properties of the environment around the electronic device and to determine the authorization confidence level using the detected state or properties. A technical effect of various examples is to identify the specific individual using an electronic device using physical sensors, and to control operation of the electronic device, e.g., control the security timeout, based on the identified individual.

In some examples, a confidence history may be updated using detected collections of signals. When the confidence history matches a stored locking condition, a user interface of the electronic device may be locked. In some examples, the locking condition may indicate a sufficiently high probability that the electronic device is no longer under the authorized user's control, e.g., due to theft or loss. Locking upon such matches may retain security even in the presence of extended security timeouts. Authorization confidence levels and confidence histories may be used together, or each may be used independently.

Various environments, configurations of electronic devices, and methods for controlling security locking are described further with reference to FIGS. 1-6. While many examples described herein relate to smartphones and other portable electronic devices, other types of electronic devices may be used, e.g., as discussed with reference to FIG. 1.

Illustrative Environment

FIG. 1 shows an example environment 100 in which electronic devices may operate and in which timeout-adjustment or security-locking methods such as described herein may be performed. In the illustrated example, the various devices and/or components of environment 100 include electronic devices 102(1)-102(N) (e.g., computing devices, individually or collectively referred to herein with reference 102), where N is any integer greater than or equal to 1. Although illustrated as, e.g., desktop computers, laptop computers, tablet computers, or cellular phones, electronic device(s) 102 may include a diverse variety of device categories, classes, or types and are not limited to a particular type of device.

By way of example and not limitation, electronic device(s) 102 may include, but are not limited to, server computers such as Web servers (e.g., 102(1)), smartphones, mobile phones, mobile phone-tablet hybrid devices, or other telecommunication devices (e.g., 102(2)), laptop computers, thin clients, terminals, or other mobile computers (e.g., 102(3)), automotive computers such as vehicle control systems, vehicle security systems, or electronic keys for vehicles (e.g., 102(4), represented graphically as an automobile), tablet computers (e.g., 102(5)), portable or console-based gaming devices or other entertainment devices such as network-enabled televisions, set-top boxes, media players, cameras, or personal video recorders (PVRs) (e.g., 102(6), represented graphically as a gamepad), personal data assistants (PDAs), computer navigation client electronic devices, satellite-based navigation system devices including global positioning system (GPS) devices and other satellite-based navigation system devices (e.g., 102(7), represented graphically as a PDA), desktop computers (e.g., 102(N)), wearable computers such as smart watches or biometric or medical sensors, implanted electronic devices such as biometric or medical sensors, integrated components for inclusion in electronic devices, appliances, or other electronic device(s) configured to participate in or carry out security-timeout adjustment or device locking as described herein, e.g., for security purposes. In some examples, as indicated, electronic device(s), e.g., electronic devices 102(1) and 102(2), may intercommunicate to participate in or carry out security-timeout adjustment or device locking as described herein. This is discussed below with reference to processing 418, FIG. 4.

Different devices or types of devices may have different timeout schemes or needs. For example, smartphones or other telecommunication devices such as electronic device 102(2) may alternate between long security timeouts and short security timeouts numerous times over the course of a day. In an example, desktop computers in office buildings, e.g., electronic device 102(N), may generally have long timeouts during the day when workers (authorized users) are in the office, then short timeouts at night when the workers are generally away from the office. Different devices or different types of devices may also include different sensors for detecting signals. For example, laptop computers may include built-in webcams that provide high-resolution video, permitting such laptop computers to use face-recognition signals determined using the high-resolution video data in controlling the timing of device locking. In some examples, portable electronic devices or navigation system devices may include location sensors, permitting use of location data and motion data in controlling the timing of device locking.

In some examples, electronic devices 102 may communicate with each other or with other electronic devices via network(s) 104. For example, network(s) 104 may include public networks such as the Internet, private networks such as an institutional or personal intranet, or combination(s) of private and public networks. Network(s) 104 may also include any type of wired or wireless network, including but not limited to local area networks (LANs), wide area networks (WANs), satellite networks, cable networks, WI-FI networks, WiMAX networks, mobile communications networks (e.g., 3G, 4G, and so forth) or any combination thereof. Network(s) 104 may utilize communications protocols such as, for example, packet-based or datagram-based protocols such as internet protocol (IP), Transmission Control Protocol (TCP), User Datagram Protocol (UDP), other types of protocols, or combinations thereof. Moreover, network(s) 104 may also include a number of devices that facilitate network communications or form a hardware infrastructure for the networks, such as switches, routers, gateways, access points, firewalls, base stations, repeaters, backbone devices, and the like. Network(s) 104 may also include devices that facilitate communications between electronic devices 102 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. Signals representing characteristics of particular networks accessible to or within range of electronic device 200 may be used in determining, e.g., whether electronic device 200 is in a trusted environment or an untrusted environment. Such signals may also be used in determining whether unauthorized users are likely to have access to electronic device 200. Such signals may also be used in determining whether an authorized user likely has control of electronic device 200.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Details of an example electronic device 102(2) are illustrated at inset 106. The details of example electronic device 102(2) may be representative of others of electronic device(s) 102. However, each of the electronic devices 102 may include additional or alternative hardware and/or software components. Still referring to the example of FIG. 1, electronic device 102(2) may include one or more processing unit(s) 108 operably connected to one or more computer-readable media 110 such as via a bus 112, which in some instances may include one or more of a system bus, a data bus, an address bus, a PCI bus, a Mini-PCI bus, a Peripheral Component Interconnect Express (PCIe) bus, and any variety of local, peripheral, or independent buses, or any combination thereof. In some examples, plural processing units 108 may exchange data through bus 112 rather than or in addition to network 104. While the processing units 108 are described as residing on the electronic device 102, the processing units 108 may also reside on different electronic devices 102 in some examples. In some examples, at least two of the processing units 108 may reside on different electronic devices 102. In such examples, multiple processing units 108 on the same electronic device 102 may use an interface bus 112 of the electronic device 102 to exchange data, while processing units 108 on different electronic devices 102 may exchange data via network(s) 104.

Computer-readable media 110 may store, for example, executable instructions of an operating system 114, a timeout engine 116, a confidence-locking engine 118, logger 120, user-adjustment engine 122, and other modules, programs, or applications that are loadable and executable by processing unit(s) 108. In some examples not shown, one or more of the processing unit(s) 108 in one of the electronic device(s) 102 may be operably connected to computer-readable media 110 in a different one of the electronic device(s) 102, e.g., via communications interface 124 and network 104. For example, program code to perform steps of flow diagrams herein may be downloaded from a server, e.g., electronic device 102(1), to a client, e.g., electronic device 102(2), e.g., via the network 104, and executed by one or more processing unit(s) 108 in electronic device 102(2). In various examples, electronic device 102(2) may include timeout engine 116, confidence-locking engine 118, or both.

Processing unit(s) 108 may be or include one or more single-core processors, multi-core processors, central processing units (CPUs), graphics processing units (GPUs), general-purpose graphics processing units (GPGPUs), or hardware logic components configured, e.g., via specialized programming from modules or APIs, to perform functions described herein. For example, and without limitation, illustrative types of hardware logic components that may be used in or as processing units 108 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 108 may represent a hybrid device, such as a device from ALTERA or XILINX that includes a CPU core embedded in an FPGA fabric. These or other hardware logic components may operate independently or, in some instances, may be driven by a CPU. In some examples, at least some of electronic device(s) 102(1)-102(N) may include a plurality of processing units 108 of multiple types. For example, the processing units 108 in electronic device 102(1) may be a combination of one or more GPGPUs and one or more FPGAs. Different processing units 108 may have different execution models, e.g., as is the case for graphics processing units (GPUs) and central processing unit (CPUs). In some examples, as described below with reference to modules 236 and 242, separate first and second processing units can be used to efficiently process signal data, reduce power consumption, and maintain flexibility in controlling locking timing. In some examples, the first processing may include an FPGA, ASIC, or DSP, and the second processing unit may include a CPU.

Electronic device 102 may also include one or more communications interfaces 124 to enable wired or wireless communications between electronic device 102 and other networked electronic devices 102 involved in sensing, security locking, or security-timeout adjustment, or other electronic device(s), over network(s) 104. Such communications interface(s) 124 may include one or more transceiver devices, e.g., network interface controllers (NICs) such as Ethernet NICs or other types of transceiver devices to send and receive communications over a network. The processing units 108 may exchange data through respective communications interface(s) 124. In some examples, the communications interface 124 may be a PCIe transceiver, and the network 104 may be a PCIe bus. In some examples, the communications interface 124 may include, but is not limited to, a transceiver for cellular (3G, 4G, or other), WI-FI, Ultra-wideband (UWB), BLUETOOTH, or satellite transmissions. The communications interface 124 may include a wired I/O interface, such as an Ethernet interface, a serial interface, a Universal Serial Bus (USB) interface, an INFINIBAND interface, or other wired interfaces. For simplicity, these and other components are omitted from the illustrated electronic device 102. Signals relating to characteristics of any networks or other links reachable by communications interface 124 may be used in controlling security lock timing in some examples. In some examples, proximity or access to trusted networks can increase the authorization confidence level.

Computer-readable media described herein, e.g., computer-readable media 110, includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage devices, and/or storage media that may be used to store and maintain information for access by an electronic device.

In contrast to computer storage media, communication media may embody computer-readable instructions, data structures, program modules, or other data in a modulated data signal, such as a carrier wave, or other transmission mechanism. As defined herein, computer storage media does not include communication media.

In some examples, computer-readable media 110 may store instructions executable by the processing unit(s) 108 that, as discussed above, may represent a processing unit incorporated in electronic device 102. Computer-readable media 110 may additionally or alternatively store instructions executable by external processing units such as by an external CPU or external processor of any type discussed above. In some examples at least one processing unit 108, e.g., a CPU, GPU, or hardware logic device, is incorporated in electronic device 102, while in some examples at least one processing unit 108, e.g., one or more of a CPU, GPU, or hardware logic device, is external to electronic device 102.

Computer-readable media 110 of the electronic device 102 may store an operating system 114. In some examples, operating system 114 is not used (commonly referred to as a "bare metal" configuration). In various examples, operating system 114 may include components that enable or direct the electronic device 102 to receive data via various inputs (e.g., user controls, network or communications interfaces, memory devices, or sensors), and process the data using the processing unit(s) 108 to generate output. The operating system 114 may further include one or more components that present the output (e.g., display an image on an electronic display, store data in memory, or transmit data to another electronic device). The operating system 114 may enable a user to interact with modules of the timeout engine 116 or the confidence-locking engine 118 using a user interface 126. Additionally, the operating system 114 may include components that perform various functions generally associated with an operating system, e.g., storage management and internal-device management.

In some examples, electronic device 102 may include user interface 126. User interface 126 may include one or more output devices configured for communication to a user or to another electronic device. Output devices may be integral or peripheral to electronic device 102. Examples of output devices may include a display, a printer, audio speakers, beepers, or other audio output devices, a vibration motor, linear vibrator, or other haptic output device, and the like.

User interface 126 may include one or more input devices, integral or peripheral to electronic device 102. The input devices may be user-operable, or may be configured for input from other electronic devices. Examples of input devices may include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, and the like. User interface 206 may include a touchscreen, as noted above, a microphone or other auditory input, or an accelerometer, grip sensor, or other haptic input.

In some examples, electronic device 102 may include one or more measurement unit(s) 128. Measurement units 128 may detect physical properties or status of electronic device 102 or its environment. Examples of measurement units 128 may include units to detect motion, temperature, pressure, light, sound, electromagnetic radiation (e.g., for wireless networking), or any other detectable form of energy or matter in or within sensing range of electronic device 102. In some examples of a smartphone electronic device 102, measurement units 128 may include an accelerometer, a microphone, or front- and rear-facing cameras. Examples of measurement units 128 may include devices for measuring physical properties, devices for communicating, or devices for receiving information. In some examples, measurement units 128 may include a network transceiver (e.g., communications interface 230, discussed below), a motion sensor, a proximity detector (e.g., for nearby life forms, people, or devices), a light sensor (e.g., a CdS photoresistor or a phototransistor), a still imager (e.g., CCD or CMOS), a video imager (e.g., CCD or CMOS), a microphone, a fingerprint reader, a retinal scanner, an iris scanner, or a touchscreen (e.g., in or associated with a display in user interface 126 such as display 208, FIG. 2).

In some examples, electronic device 102 may include one or more sensors 130. Components of communications interface 124, e.g., transceivers for BLUETOOTH, WI-FI, or LTE, may be examples of sensors. Such components can be used to, e.g., detect signals corresponding to characteristics of accessible networks. Such signals may also be detected by automatically locating information in a table of network information (e.g., cell-phone tower locations), or by a combination of detection by component of communications interface 124 and table lookup. Components of user interface 126, e.g., touchscreens or phone mouthpieces, may also be examples of sensors 130. Measurement units 128 may also be examples of sensors 130. In some examples, a particular device may simultaneously or selectively operate as part of two or more of communications interface 124, user interface 126, and one or more measurement unit(s) 128. For example, a touchscreen may be an element of user interface 126 and used to present information and receive user commands. Signals from the same touchscreen may also be used in determining a user's grip on electronic device 102, as discussed below. Accordingly, that touchscreen is also a sensor 130.

In some examples, logger 120 includes logic or computer program instructions executable by processing unit(s) 108 to record readings from sensors 126, e.g., in computer-readable media 110. Logger 120 may also or alternatively record computations performed or results provided by timeout engine 116 or confidence-locking engine 118. This permits offline tuning or adjustment of authorization confidence levels and timeout periods to improve user satisfaction and device security. In some examples, data of signals from sensors 126, data of computations performed by timeout engine 116 or confidence-locking engine 118, and resulting authorization confidence levels may be logged in an operating-system or other event logger (e.g., MICROSOFT eventvwr).

In some examples, user-adjustment engine 122 includes logic or computer program instructions executable by processing unit(s) 108 to permit an authorized user of the electronic device 102 to control relationship(s) between signals detected by sensor(s) 130, authorization confidence levels, and the timing of security locking. In some examples, user-adjustment engine 122 may be configured to present information to an authorized user via communications interface(s) 124 or user interface 126. User-adjustment engine 122 may be configured to receive input, e.g., from the authorized user, via communications interface(s) 124 or user interface 126. User-adjustment engine 122 may be configured to store data of user preferences in computer-readable media 110. This may permit authorized users to balance convenience and security, and may permit different authorized users of a particular electronic device 102 to use different settings or preferences. Examples are discussed below.

Illustrative Components

Figure 2:
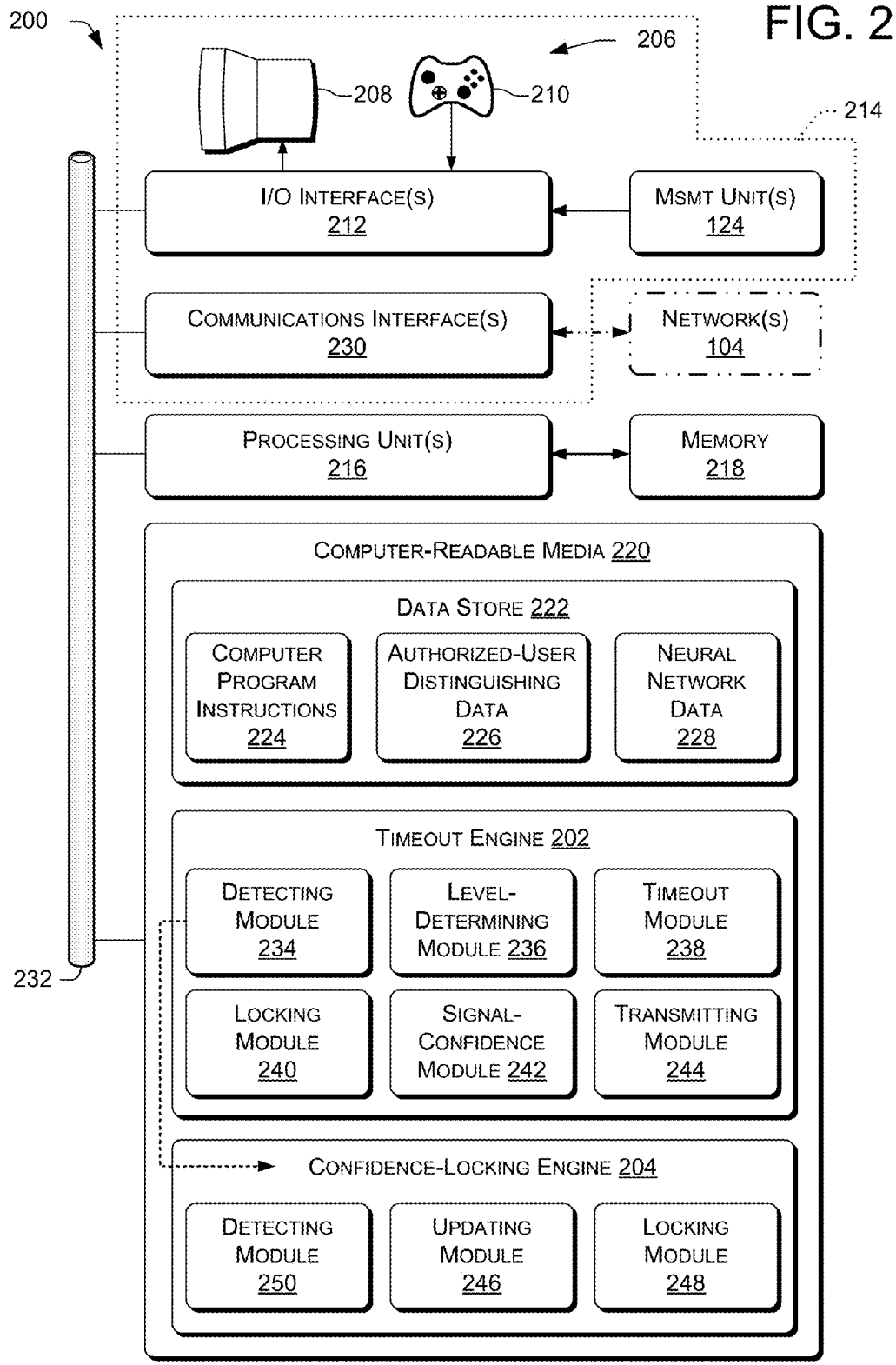
FIG. 2 is a block diagram depicting an example electronic device configured to participate in security-timeout adjustment or locking according to various examples described herein.

FIG. 2 is an illustrative diagram that shows example components of an electronic device 200, which may represent electronic device(s) 102, and which may be configured with an adjustable timeout, or be locked, according to various examples described herein. Electronic device 200 may implement a timeout engine 202, which may represent timeout engine 116, FIG. 1. Electronic device 200 may implement confidence-locking engine 204, which may represent confidence-locking engine 118, FIG. 1.

Electronic device 200 may include or be connected to a user interface 206, which may represent user interface 126. User interface 206 may include a display 208. Display 208 may include an organic light-emitting-diode (OLED) display, a liquid-crystal display (LCD), a cathode-ray tube (CRT), or another type of visual display. Display 208 may be a component of a touchscreen, or may include a touchscreen. User interface 206 may include various types of output devices described above with reference to user interface 126.

User interface 206 may include a user-operable input device 210 (graphically represented as a gamepad). User-operable input device 210 may include various types of input devices described above with reference to user interface 126.

Electronic device 200 may further include one or more input/output (I/O) interface(s) 212 to allow electronic device 200 to communicate with input, output, or I/O devices (for clarity, some not depicted). Examples of such devices may include components of user interface 206 such as user-operable input devices and output devices described above with reference to user interface 126. Electronic device 200 may communicate via I/O interface 212 with suitable devices or using suitable electronic/software interaction methods. Input data, e.g., of user inputs on user-operable input device 210, may be received via I/O interface(s) 212, and output data, e.g., of user interface screens, may be provided via I/O interface(s) 212 to display 208, e.g., for viewing by a user.

The electronic device 200 may include one or more sensors 214, which may represent measurement units 128, as described above with reference to FIG. 1. Sensors 214 may also include components of user interface 206. In some examples, the user interface 206 may include at least one of the sensors 214. For example, the user interface 206 may include a touchscreen that is a sensor 214.

The electronic device 200 may include one or more processing unit(s) 216, which may represent processing unit(s) 108. Processing units 216 may be operably coupled to the sensors 214 and to at least one computer-readable media 220, discussed below. Processing unit(s) 216 may include, e.g., processing unit types described above such as CPU- or GPGPU-type processing unit(s). In some examples, processing unit(s) 216 may include or be connected to a memory 218, e.g., a random-access memory (RAM) or cache.

In some examples, computer-readable media 220 of the electronic device 200 may store a plurality of modules of the timeout engine 202 or the confidence-locking engine 204. Processing unit(s) 216 may be configured to execute modules of the plurality of modules. The modules stored in the computer-readable media 220 can include instructions that, when executed by the one or more processing units 216, cause the one or more processing units 216 to perform operations described below with respect to modules 234-248. Examples of modules in computer-readable media 220 are discussed below. Computer-readable media 220 may also include an operating system, e.g., operating system 114 (omitted for brevity). Computer-readable media 220 may be computer storage media, as discussed above.

In the illustrated example, computer-readable media 220 includes a data store 222. In some examples, data store 222 may include data storage, structured or unstructured, such as a database or data warehouse. In some examples, data store 222 may include a corpus or a relational database with one or more tables, arrays, indices, stored procedures, and so forth to enable data access. Data store 222 may store data for the operations of processes, applications, components, or modules stored in computer-readable media 220 or computer instructions in those modules executed by processing unit(s) 216. In some examples, the data store may store computer program instructions 224 (e.g., instructions corresponding to smartphone apps, to processes described herein, or to other software executable by processing unit(s) 108), distinguishing data 226 such as discussed below, neural-network data 228 such as neuron-interconnection weights, or any combination thereof. In some examples, distinguishing data 226 may be used to determine whether electronic device 200 is under control of an authorized user.

Distinguishing data 226 may include data corresponding to of an authorized user of the electronic device 200. As noted above, a single electronic device 200 may have one or more authorized user(s). Data store 222 may store respective distinguishing data 226 for each of the authorized user(s). Data store 222 may additionally or alternatively store respective distinguishing data 226 for each of a number of groups of one or more of the authorized users. In some examples, the authorized users may be divided into groups having different levels of access to the electronic device, e.g., users or administrators of a desktop PC. Data store 222 may store respective distinguishing data 226 for the users and for the administrators, or respective distinguishing data for each authorized user, or both.

Distinguishing data 226 may include one or more profiles or other data indicative of whether the possessor or operator of electronic device 200 is an authorized user of electronic device 200. In some examples, distinguishing data 226 may include data of the gait, typing cadence, PIN, password, unlock pattern, faceprint, voiceprint, retinal pattern, iris pattern, or other biometric characteristic or user-provided secret of an authorized user (or of each of multiple authorized users).

Distinguishing data 226 may additionally or alternatively include one or more profiles or other data indicative of presence of electronic device 200 in a secure environment. Distinguishing data 226 may include data useful for determining whether the electronic device 200 is in such an environment, e.g., a manufacturer's testing laboratory.

Distinguishing data 226 may additionally or alternatively include one or more profiles or other data indicative of an insecure condition of the electronic device 200. Distinguishing data 226 may include data useful for determining whether the electronic device 200 is likely outside the possession or control of an authorized user, e.g., due to theft or loss of the electronic device 200. In some examples, distinguishing data 226 may include data of a gait of a fleeing person, a number of incorrect PIN or password attempts, or other data representing expected behavior of an unauthorized user or unexpected behavior of an authorized user.

The electronic device 200 may also include a communications interface 230, which may represent communications interface 124. For example, communications interface 230 may include a transceiver device such as a network interface controller (NIC) to send and receive communications over a network 104 (shown in phantom), e.g., as discussed above. As such, the electronic device 200 may have network capabilities. For example, the electronic device 200 may exchange data with electronic devices 102 (e.g., laptops, computers, servers, etc.) via one or more network(s) 104, such as the Internet. As discussed above, sensors 214 can include components of communications interface 230.

In various examples, the processing unit(s) 216 may access the module(s) on the computer-readable media 220 via a bus 232, which may represent bus 112, FIG. 1. I/O interface 212 and communications interface 230 may also communicate with processing unit(s) 216 via bus 232.

The modules of the timeout engine 202 stored on computer-readable media 220 may include one or more modules, e.g., shell modules, or application programming interface (API) modules) which are illustrated as a detecting module 234, a level-determining module 236, a timeout module 238, and a locking module 240. In some examples, the timeout engine 202 may include a signal-confidence module 242 or a transmitting module 244.

The modules of the confidence-locking engine 204 stored on computer-readable media 220 may include one or more modules or APIs, which are illustrated as an updating module 246 and a confidence-locking module 248. In an example, confidence-locking engine 204 may use signals from detecting module 234 in timeout engine 202. In some examples, the confidence-locking engine 204 may include a confidence-locking detecting module 250.

In the timeout engine 202 or the confidence-locking engine 204, the number of modules may vary higher or lower, and modules of various types may be used in various combinations. For example, functionality described associated with the illustrated modules may be combined to be performed by a fewer number of modules or APIs or may be split and performed by a larger number of modules or APIs. For example, the level-determining module 236 and the timeout module 238 may be combined in a single module that performs at least some of the example functions described below of each of the modules.

In some examples, the modules of the timeout engine 202 may include the detecting module 234 configured to detect multiple signals using the one or more sensor(s) 214, e.g., via the I/O interface 212 and the bus 232. Throughout this disclosure, electronic device 200 may detect additional signals or collections of signals that are not processed by herein-described modules or do not undergo herein-described processing steps.

Detected signals may include position of electronic device 200, e.g., as measured using GPS, triangulation from cellphone towers or WI-FI access points, or other geolocation techniques. Detected signals may include speed, velocity, acceleration, or jerk of motion of electronic device 200, or orientation of electronic device 200, e.g., as measured by accelerometer(s) on or associated with electronic device 200. Detected signals may include orientation of electronic device 200 in a hand of a person, the size of the person's hand, or whether the person is gripping electronic device 200 with a left hand or a right hand, determined, e.g., using grip sensor(s), touch sensor(s), and/or touchscreen(s). Detected signals may include audio data, e.g., of a nearby person's voice or speech. Audio data may be captured by a mouthpiece of a smartphone, or by another microphone of electronic device 200. Detected signals may include video or photographic data of a person using electronic device 200. Detected signals may include behavioral characteristics of a person using electronic device 200, e.g., cadence of the person's typing on a keyboard or soft keyboard, or what style of input the user is primarily employing (e.g., orientation of device during input, or per-letter touch vs. wholeword swipe). Detected signals may include characteristics of the gait of a person carrying electronic device 200, e.g., speed, frequency of footfalls, leg length (inferred from speed and footfalls), or whether the person is favoring one leg over the other. Detected signals may be determined using other detected signals (e.g., gait signals may be detected by processing accelerometer and GPS data).

The level-determining module 236 may determine an authorization confidence level of the detected signals based at least in part on the distinguishing data 226 stored in the computer-readable media 220. The authorization confidence level may indicate whether the electronic device 200 is under the control of an authorized user of the electronic device 200. For example, the authorization confidence level may represent the likelihood that an authorized user is in possession or control of the electronic device 200 (e.g., is holding or using electronic device 200). For example, level-determining module 236 may compare detected signal(s) to distinguishing data 226 and determine, e.g., a level of correlation between the signal(s) and the distinguishing data 226 as the authorization confidence level.

Throughout this disclosure, for purposes of explanation, higher authorization confidence levels are described as representing a greater likelihood that an authorized user is in possession or control of the electronic device 200 than do lower authorization confidence levels. However, this is not limiting. In some examples, a lower authorization confidence level represents a greater likelihood than does a higher authorization confidence level, an authorization confidence level closer to a selected reference point (e.g., zero) represents a greater likelihood than does an authorization confidence level farther from the selected reference point, or an authorization confidence level farther from a selected reference point represents a greater likelihood than does an authorization confidence level closer to the selected reference point.

In various examples, any of the following may correspond to relatively high authorization confidence levels: signals indicating that electronic device 200, e.g., a smartphone, is paired to a BLUETOOTH device in a vehicle such as a MICROSOFT SYNC or PARROT CK3000 EVOLUTION, or to a home WI-FI network; detection of a wearable device such as a FITBIT or MICROSOFT BAND within a selected distance of electronic device 200; and/or a detected location of electronic device 200 being within a specific range of the authorized user's home or other trusted location. In some examples, level-determining module 236 may determine a relatively high authorization confidence level when a trusted smartphone is near electronic device 200 and electronic device 200 is also within range of a trusted WI-FI network. This example may be used, e.g., with home laptop computers. In various examples, level-determining module 236 may maintain a substantially constant authorization confidence level while detected signal(s) (e.g., low ambient light level or attenuated high frequencies of ambient noise) indicate electronic device 200 is confined within a carrying space, e.g., a purse or pocket.

In an example, if the authorization confidence level is relatively high when the detected signal(s) begin to indicate electronic device 200 is confined within a carrying space, the authorization confidence level may remain relatively high during such confinement, as electronic device 200 is likely being carried by an authorized user. In an example, if the authorization confidence level is relatively low when the detected signal(s) begin to indicate electronic device 200 is confined within a carrying space, the authorization confidence level may remain relatively low during such confinement, as electronic device 200 may be in a suitcase or other storage item of an unauthorized user or thief.

In some examples, the level-determining module 236 may smooth the determined authorization confidence level across changes in the trusted signals. For example, if electronic device 200 is paired with a trusted BLUETOOTH device (e.g., an automobile), then unpairs, and enters the range of a trusted WI-FI network (e.g., at home) before or shortly after unpairing from the trusted BLUETOOTH device, the level-determining module 236 may maintain the authorization confidence level across the change from BLUETOOTH to WI-FI so that the authorized user is not required to enter credentials as a result of having traveled from one trusted area (e.g., the authorized user's car) to another (e.g., the authorized user's home or office).

In some examples, distinguishing data 226, computer program instructions 224, and/or other data or code stored on computer-readable media 220 may include an indication that some of the signals, or selected levels of some of the signals, override or otherwise trump other(s) of the signals, or any other signals. For example, the distinguishing data 226 may store a threshold of accelerometer data indicating that electronic device 200 has been dropped. When the detected signals from the accelerometer data match the stored threshold, the level-determining module 236 may reduce the authorization confidence level regardless of what other signals are present, in accordance with the stored threshold.

In some examples, the level-determining module 236 may form the authorization confidence level by first computing the product of a stored weight matrix and a vector of values of the signals. The product may be a vector, and the authorization confidence level may be determined as, e.g., the norm or the largest or smallest component of that vector. Using a matrix-vector product permits adjusting the authorization confidence level based on combinations of signals. For example, some signals may have a more significant influence on the authorization confidence level when accompanied by other signals or other combinations of some or all of the signals. In some examples, velocity signals may have a more significant influence on the authorization confidence level when accompanied by relatively variable acceleration signals, e.g., indicative of walking or running, than when accompanied by relatively steady acceleration signals, e.g., indicative of riding in a car.

In some examples, the weight matrix may be a 1×n or m×1 matrix, and the matrix-vector product may be a dot product. This permits forming the authorization confidence level as a weighted average of values of the signals. In some examples, the weights may be adjustable via user-adjustment engine 122, FIG. 1.

In some examples, in place of one or more of the signals, the vector of values may include one or more signal-confidence levels computed by signal-confidence module 242, described below, or one or more values computed from signal values or signal-confidence levels (e.g., the result of squaring a signal-confidence level). In some examples, what signals or transformations of signals to use in the vector of values may be adjustable via user-adjustment engine 122, FIG. 1. For example, a user may prefer that trusted-BLUETOOTH-device data not be used in determining the authorization confidence levels.

In some examples, level-determining module 236 may determine the authorization confidence level based at least in part on consistency of input signals over time. For example, if electronic device 200 has been moving at a relatively constant speed (e.g., within ±10%) for a selected period of time, but then changes speed outside the ±10% band, level-determining module 236 may reduce the determined authorization confidence level. In some examples, the percentage width of the band may be adjustable via user-adjustment engine 122, FIG. 1.

In some examples, level-determining module 236 may form the authorization confidence level by hashing elements of the vector of values, or quantized or binned versions thereof, and looking up an authorization confidence level in the corresponding cell of a hash table. In some examples, the values in the hash table may be adjustable via user-adjustment engine 122, FIG. 1.

In some examples, level-determining module 236 may form the authorization confidence level by determining whether one or more of the detected signal(s) trump others of the detected signal(s), e.g., by using a stored table. If a detected signal does trump others, the authorization confidence level may be retrieved from the stored table of trumps. For example, accelerometer data indicating electronic device 200 has abruptly changed direction may trump all other signals and provide an authorization confidence level indicating minimum trust. In some examples, a signal indicating a locking or power button of electronic device 200 has been pressed may trump all other signals and provide an authorization confidence level indicating minimum trust. Timeout module 238 may determine the time period is 0 s responsive to the minimum-trust authorization confidence level, causing electronic device 200 to lock immediately. In some examples, if selected patterns or conditions are detected, the authorization confidence level may be very high. Some signals may trump other signals and correspond to an authorization confidence level indicating maximum trust, or trust exceeding a threshold authorization confidence level. Such threshold authorization confidence levels can fall within a locking-disabling range, described below.

In some examples, timeout module 238 may determine a time period using the determined authorization confidence level. In some examples, the time period may be proportional to the authorization confidence level or otherwise positively correlated with the authorization confidence level. In some examples, timeout module 238 may disable the security timeout in response to the determined authorization confidence level matching a selected confidence condition, e.g., an authorization confidence level of at least a selected value or of at least a selected percentage of full scale. In some examples, the degree of correlation between authorization confidence level and time period may be adjustable via user-adjustment engine 122, FIG. 1. For example, user-adjustment engine 122 may provide access to lookup table or piecewise functional representation of a mapping, e.g., a surjective mapping, from authorization confidence level to time period.

In some examples, locking module 240 may lock user interface 206 in response to inactivity of the user interface 206 for the determined time period, e.g., once, when, whenever, as soon as, or after the determined time period has elapsed, or upon elapsing of the determined time period, without user interface 206 activity. Upon detecting such inactivity for the determined time period, locking module 240 may record information, e.g., in memory 218, indicating that user interface 206 is locked. Processing unit(s) 216 may respond to this indication by, e.g., displaying a prompt for unlocking information (a "lock screen") and ignoring inputs from user-operable input device 210 that do not correspond to the unlocking information. Inactivity of the user interface 206 may be detected when, e.g., a touchscreen display 208 has not been touched or an eye tracker has not detected eye motion indicative of reading content on the display. Locking module 240 may include a timer that counts the determined time period and is reset when activity of user interface 206 is detected.

In some examples, inactivity of the user interface 206 may be detected when, for example, no selected component(s) of user interface 206 have detected signals indicative of user operation of, or interaction with, the user interface 206. In some examples, inactivity of user interface 206 may be detected except when one of the selected component(s) detects such signals. In some examples, the electronic device 200 may include an accelerometer (not shown), but the accelerometer may be excluded from the selected component(s). In this example, motion of the electronic device 200, e.g., while being carried in a person's hand, pocket, or bag, may be disregarded in the determination of whether user interface 206 is active.

In some examples, the modules of the timeout engine 202 may include signal-confidence module 242 configured to determine a signal-confidence level based at least in part on a first collection of one or more of the detected signals. In this example, the level-determining module 236 may be configured to determine the authorization confidence level based at least in part on the determined signal-confidence level.

In some examples, the level-determining module 236 may form the authorization confidence level as an aggregate confidence level based on a plurality of signal-confidence levels. In some examples, the level-determining module 236 may form the authorization confidence level as a weighted sum of a plurality of signal-confidence levels. In some examples, the timeout module 238 may disable locking (determine timeout should be co) if the weighted sum is within a selected range, e.g., 80%-100% of a peak value of the weighted sum. In some examples, the timeout module 238 may determine the timeout inversely proportional to the weighted sum. In some examples, the timeout module 238 may determine the timeout inversely proportional to the weighted sum, provided the weighted sum is not within a selected locking-disabling range. In an example, electronic device 200 may be a laptop computer, and the signals may be proximity of the authorized user's smartphone and presence of a trusted home WI-FI network. When both signals are present, the weighted sum may be within a locking-disabling range, so that the authorized user can use the computer without having to re-enter credentials while at home. However, when the authorized user is using the laptop away from home, or when another person is using the laptop at the authorized user's home while the authorized user is away from home, the weighted sum may not be within the locking-disabling range. Accordingly, the laptop computer may have a locking timeout.

In some examples, the level-determining module 236 may determine the authorization confidence level based on consistency of one or more signal-confidence level(s). For example, if the signal-confidence level of typing cadence data abruptly changes, either higher or lower, the level-determining module 236 may reduce the authorization confidence level.

In some multiple-processing-unit examples, the one or more processing unit(s) 216 may include a first processing unit and a second processing unit (not separately illustrated). The first processing unit may be a coprocessor and the second processing unit may be a main processor. The first processing unit (e.g., the coprocessor) executes instructions at least in the signal-confidence module 242. The second processing unit (e.g., the main processor) executes instructions in the locking module 240. In some examples, the first processing unit may be powered even when the main processor and user-accessible functions of the electronic device 200 are in a "sleep" state, e.g., an inactive, suspended, hibernating, or power-off state.

Continuing these multiple-processing-unit examples, the signal-confidence module 242 may further determine that the signal-confidence level matches a stored condition and, in response, may wake the second processing unit from a sleep state. The condition may be stored in code, e.g., in signal-confidence module 242, or in data, e.g., in data store 222. The condition may include the signal-confidence level falling within a stored range, falling or being below or above a stored threshold, changing more rapidly or more slowly than a stored rate threshold, or having a value, an nth derivative, or an n-fold integral ($n \geq 1$) within a stored open, half-closed, or closed interval.

The first processing unit may be a coprocessor designed specifically for determining signal-confidence levels using signal-confidence module 242, and thus designed to perform such processing while dissipating less power than the second processing unit. This permits reducing the power consumption of electronic device 200 by leaving the second processing unit in a sleep state except when necessary.

Specifically, in some examples, the one or more processing units include a first processing unit and a second processing unit. The second processing unit is configured to perform the operations of locking the user interface. The computer-readable media 220 further stores instructions (e.g., in signal-confidence module 242) that, when executed by the first processing unit, cause the first processing unit to perform operations comprising determining a signal-confidence level based at least in part on a first collection of one or more of the detected signals; determining that the signal-confidence level matches a stored condition; and in response to the matching the stored condition, waking the second processing unit from a sleep state.

In some examples, electronic device 200 may include multiple first processing units executing instructions in respective signal-confidence modules 242 with respect to corresponding detected signals from corresponding one(s) of the sensors 214. In some examples, electronic device 200 may include an accelerometer (a sensor 214) and a first processing unit configured to process accelerometer data, and may also include a touchscreen (another sensor 214) and a separate first processing unit configured to process touch data. Either first processing unit may wake the second processing unit as determined by the respective signal-confidence module 242.

In some examples, one first processing unit may be configured to receive signals from an accelerometer of the electronic device 200 and determine a gait of a person holding or carrying the electronic device 200 using the accelerometer signals. The first processing unit may store data representing the gait of an authorized user and may determine a level indicating an extent to which the measured gait corresponds to the stored data. If the level falls below a stored threshold, indicating that someone other than the authorized user is carrying the electronic device 200, the first processing unit may wake the second processing unit. The second processing unit may then receive the signal-confidence level from the first processing unit and adjust a security timeout or lock the electronic device 200. In some examples, the first processing unit is arranged in a separate electronic device (not shown), e.g., a smart watch, and the second processing unit is arranged in electronic device 200, e.g., a smartphone.

In some examples, the sensors 214 may include a network transceiver in communications interface 230 and the multiple signals may include a remote-device confidence signal. The detecting module 234 may receive the remote-device confidence signal via the network transceiver. The remote-device confidence signal may be provided by another electronic device 102. In some examples, the modules of the timeout engine 202 may include the transmitting module 244 configured to transmit the determined authorization confidence level via the network transceiver.

Examples receiving or transmitting confidence levels may permit multiple devices to interoperate to determine confidence levels. In some examples, a smart watch may transmit a determined authorization confidence level to a smartphone, e.g., using transmitting module 244. The smartphone may receive the smartwatch's determined authorization confidence level as the remote-device confidence signal, e.g., using detecting module 234. The smartphone may incorporate the remote-device confidence signal in the determination of the smartphone's authorization confidence level. In some examples, the smartphone (or other electronic device 200) may determine a higher authorization confidence level if a smart watch is present and transmits a high-level remote-device confidence signal than if the smart watch is present but does not transmit such a signal. In some examples, a remote device, such as a smart watch, may determine the timing of locking of a local device, such as a smartphone, and the local device may determine its authorization confidence level equal to the remote-device confidence signal, or based solely on the remote-device confidence signal. These examples permit, e.g., a single electronic device 200, such as a smart watch, to lock or control the locking timeout of one or more other electronic devices 200, such as a cell phone, a pager, a tablet, or a personal media player.

In various examples, intercommunicating electronic devices 200 may use public- or private-key-based, or hash-based, mechanisms for identification, authentication, authorization, or encryption. In some examples, detecting module 234 may disregard any remote-device confidence signal not digitally signed by a device holding a trusted certificate.

In some examples, the modules of the confidence-locking engine 204 may include confidence-locking detecting module 250. Confidence-locking detecting module 250 may detect a collection of signals using one or more sensors of an electronic device. The detection may be performed once, or may be performed intermittently or repeatedly for each of a plurality of collections of the signals. In some examples, confidence-locking engine 204 may, once, intermittently, or repeatedly, receive data of detected signals from detecting module 234 of timeout engine 202.

Updating module 246 may update a confidence history using the collection of signals, or each of the collections of signals in the plurality of collections of signals. For example, updating module 246 may maintain in the confidence history a record of values, an average, a windowed or other running average, or an exponentially-weighted moving average (EWMA) of values of one or more of the signals in the collection(s), or may track the standard deviation, minimum, maximum, quartiles, or other statistical properties of one or more of the signals.

Confidence-locking module 248 may respond to a match of the confidence history to a stored locking condition by locking user interface 206 of the electronic device 200. For example, confidence-locking module 248 can determine a match by determining whether at least some of the stored signal values in the record of values in the confidence history match the stored locking condition. The locking condition may be stored in code, e.g., in confidence-locking module 248, or in data, e.g., in distinguishing data 226 or other elements of data store 222. The stored locking condition may, e.g., correspond to behavior atypical of an authorized user.

In some examples, the detected signals may include motion data and an indication of whether a left hand or a right hand is gripping the electronic device. The indication may be received, e.g., from a grip sensor of sensor(s) 214. The locking condition may include motion out of a left hand and into a left hand, or out of a right hand and into a right hand. Such motion may indicate that the electronic device 200 was in the possession of one person, e.g., the authorized user, and is now in the possession of another person.

In some examples, the signals may include accelerometer data. The locking condition may include a change in acceleration having a magnitude exceeding a selected threshold. The change in acceleration may be expressed as a jerk (derivative of acceleration, i.e., $3^{rd}$ derivative of position). Such a locking condition may relate to the electronic device 200's abruptly speeding up, slowing down, changing direction, or any combination thereof. The jerk threshold may be in any direction or only in selected directions. Such jerk values may indicate that the electronic device 200 has been dropped. Such jerk values may indicate that an authorized user's electronic device 200 has been stolen by a thief, who is running or otherwise moving quickly away from the authorized user.

In some examples in which collections of signals are repeatedly detected, confidence-locking engine 204, e.g., in updating module 246, may determine a respective authorization confidence level using each of the collections of signals. In these examples, the confidence history may include an average (e.g., running or cumulative) of the determined respective authorization confidence levels. The locking condition may include an interval (open, closed, or half-closed) of values of the average.

In some examples in which collections of signals are repeatedly detected, confidence-locking engine 204, e.g., in updating module 246, may determine a respective signal-confidence level for each signal in each of the collections of signals. Updating module 246 may determine an aggregate confidence level for each of the collections of signals using the corresponding signal-confidence levels. Updating module 246 may update the confidence history using each of the aggregate confidence levels. Techniques described herein with respect to signal-confidence module 242 and level-determining module 236 can be used in determining signal-confidence levels and an aggregate confidence level.

In some examples, certain element(s) of the confidence history may trump others, e.g., as described above with respect to level-determining module 236. For example, distinguishing data 226 may include an accelerometer threshold indicating electronic device 200 has been dropped. When the confidence history indicates that the accelerometer data meet or exceed the threshold, confidence-locking module 248 may lock electronic device 200 regardless of other elements of the confidence history, in accordance with stored relative priorities of the signals or other trumping rules.

In some examples, the confidence-locking module 248 may lock electronic device 200 based at least in part on loss of consistency of one or more element(s) of the confidence history. For example, if the standard deviation, time derivative, or other characteristic stored in the confidence history with respect one of the signals, exceeds a selected threshold, the confidence-locking module 248 may lock electronic device 200.

In some examples, timeout engine 202 or confidence-locking engine 204 may be configured to perform functions noted above with respect to signals such as presence of a trusted device (e.g., a desktop computer or BLUETOOTH headset). Engines 202 or 204 may use other signals, e.g., gait or typing cadence, to improve security of electronic device 200. For example, engines 202 or 204 may use typing cadence to determine that an unauthorized user is interacting with electronic device 200 even if electronic device 200 is in the presence of a trusted device. Any of the above-listed types of electronic devices 102 may serve as trusted devices for other electronic devices 102. In some examples, e.g., a portable electronic device serves as a trusted device for a desktop computer (or vice versa). In some examples, an electronic key serves as a trusted device for a vehicle security system.

Illustrative Processes

Figure 3:
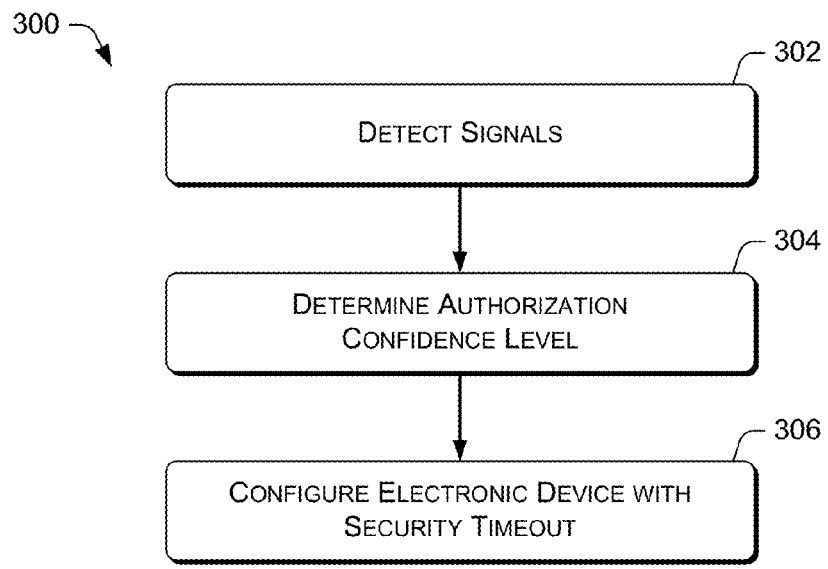
FIG. 3 is a flow diagram that illustrates an example process for configuring an electronic device according to various examples described herein.
Figure 4:
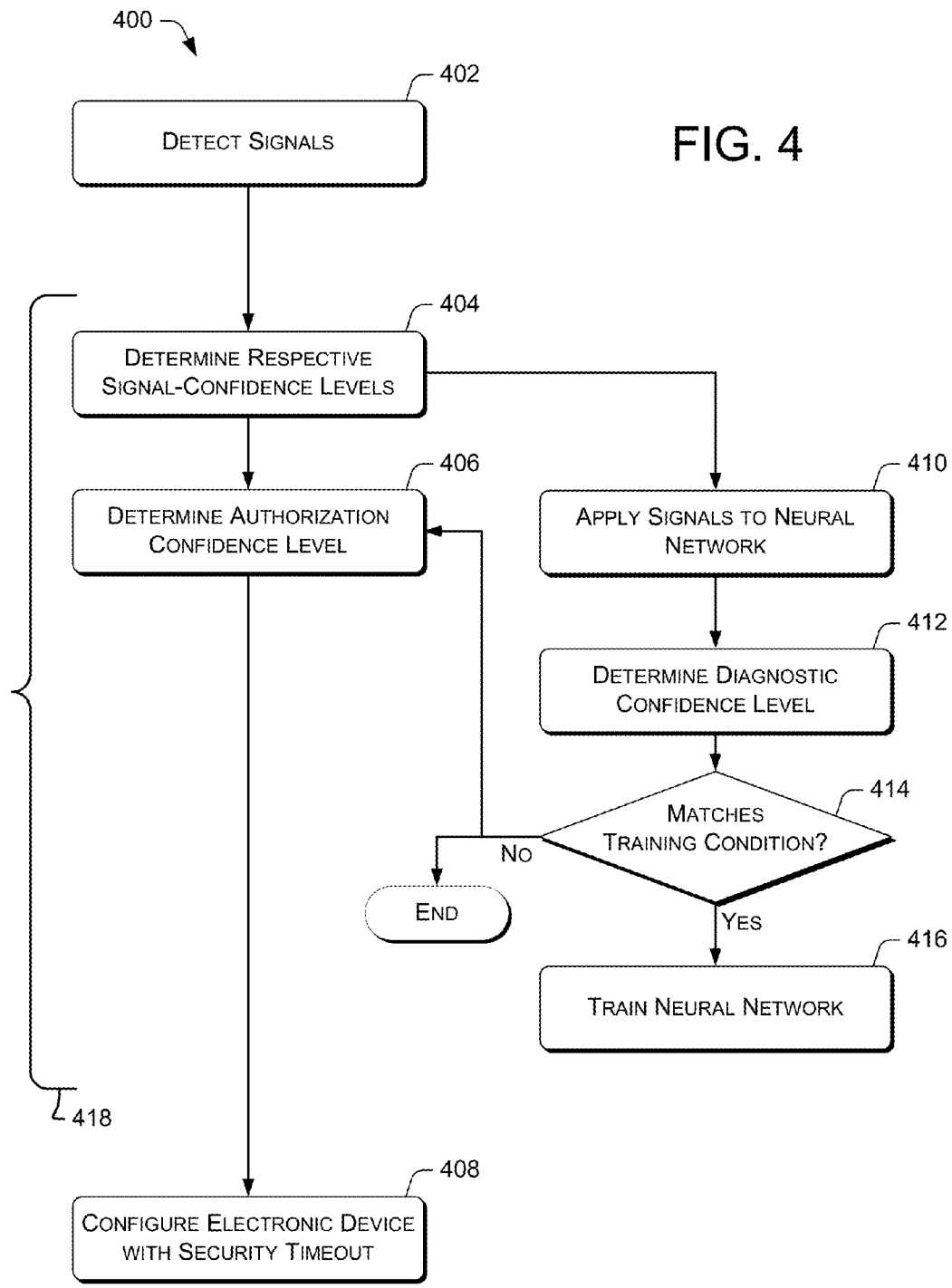
FIG. 4 is a flow diagram that illustrates an example process for configuring an electronic device according to various examples described herein.
Figure 5:
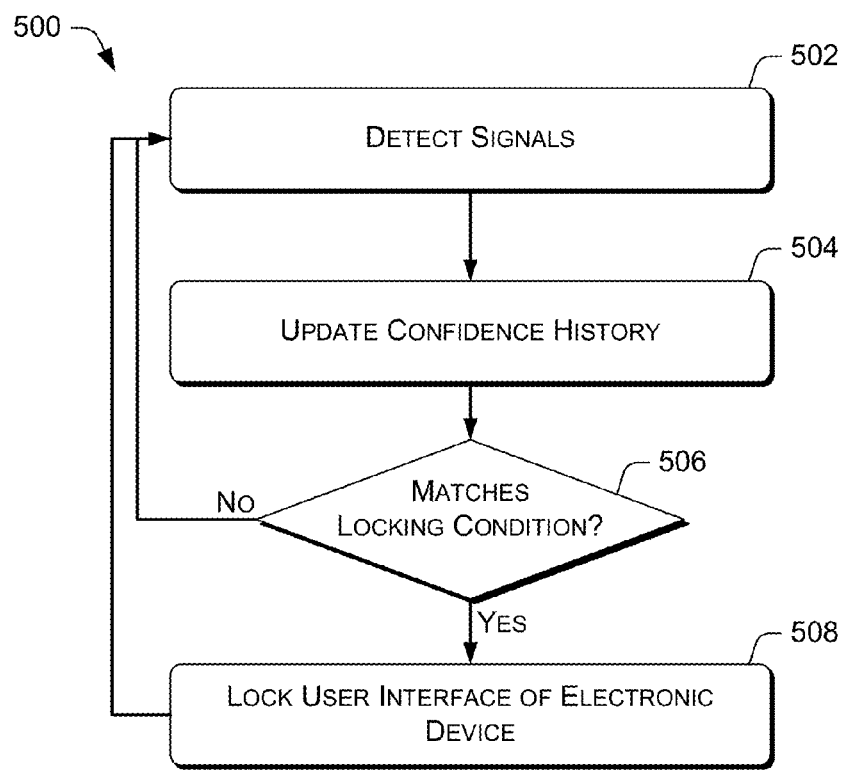
FIG. 5 is a flow diagram that illustrates an example process for locking a user interface of an electronic device according to various examples described herein.
Figure 6:
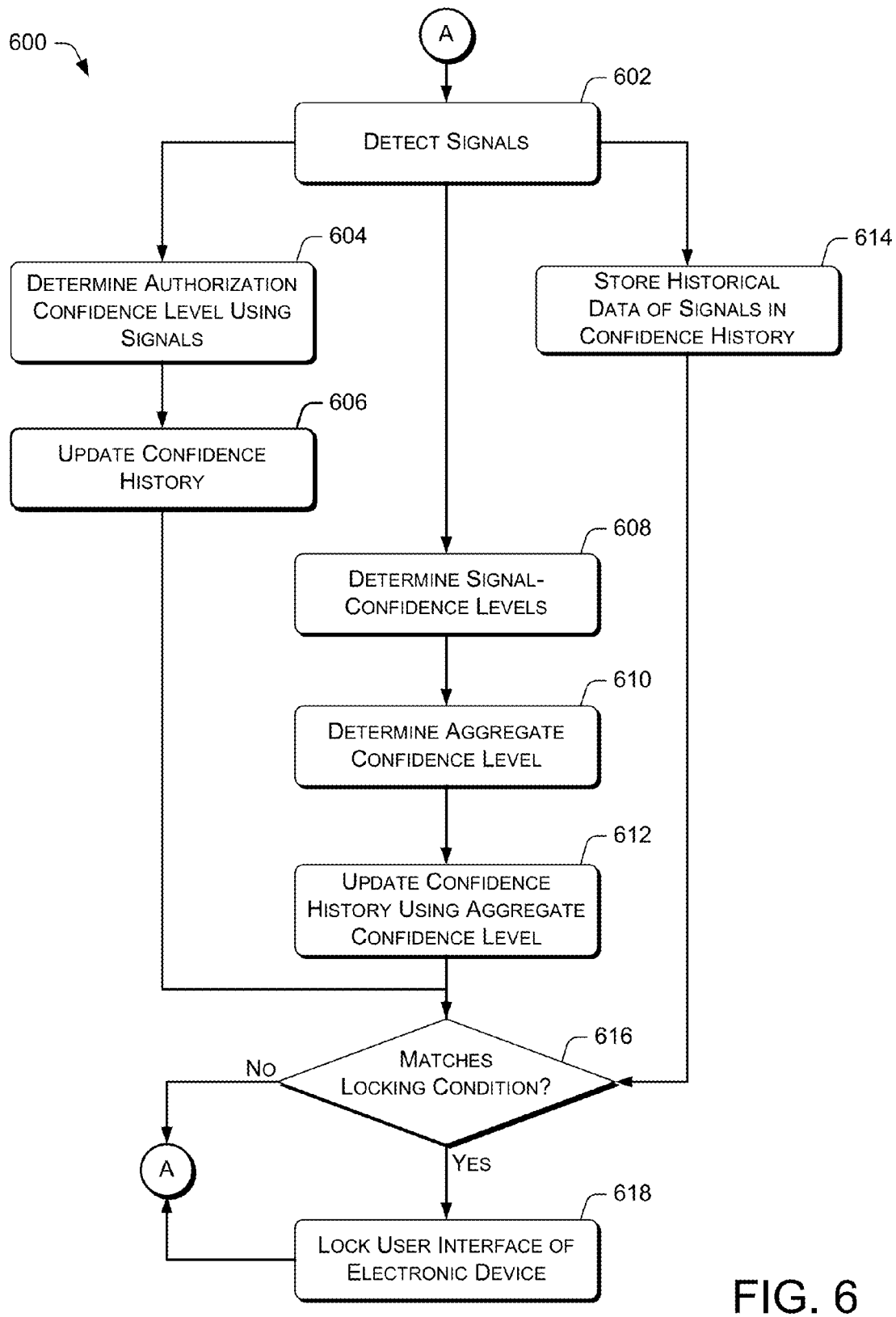
FIG. 6 is a flow diagram that illustrates an example process for locking a user interface of an electronic device according to various examples described herein.

FIG. 3 is a flow diagram that illustrates an example process 300 for configuring an electronic device, e.g., electronic device 200, FIG. 2. Example functions shown in FIG. 3 and other flow diagrams and example processes herein may be implemented on or otherwise embodied in one or more electronic device(s) 102. In various examples, example functions may be implemented using as software running on an electronic device 102. For the sake of illustration, the example process 300 is described below with reference to processing unit 216 and other components of electronic device 200, FIG. 2, that can carry out or participate in the steps of the exemplary method. However, other processing unit(s) such as processing unit 108 and/or other components of electronic device(s) 102 may carry out step(s) of described example processes such as process 300. Similarly, exemplary method(s) shown in FIGS. 4, 5, and 6 are also not limited to being carried out by any specifically-identified components.

The order in which the operations are described in each example flow diagram or process is not intended to be construed as a limitation, and any number of the described operations may be combined in any order and/or in parallel to implement each process. Moreover, the operations in each of FIGS. 3, 4, 5, and 6 may be implemented in hardware, software, and a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

At block 302, timeout engine 202 may detect multiple signals using one or more sensors of an electronic device 200. The signals may include inputs, data of user behavior, or other signals discussed above with reference to detecting module 234. Exemplary functions performed in block 302, and exemplary sensors, are described above with reference to sensors 214 and detecting module 234, FIG. 2.

At block 304, timeout engine 202 may automatically determine an authorization confidence level using the detected signals. The authorization confidence level may indicate whether the electronic device 200 is under the control of an authorized user of the electronic device. Exemplary functions performed in block 304 are described above with reference to level-determining module 236, FIG. 2.

At block 306, timeout engine 202 may configure the electronic device 200 to have a security timeout based at least in part on the authorization confidence level from block 304. Exemplary functions performed in block 306 are described above with reference to timeout module 238, FIG. 2.

In some examples, one or more of blocks 302, 304, 306 may be performed asynchronously. For example, an operating system may periodically or intermittently schedule task(s) to perform one or more of blocks 302, 304, and 306. The task(s) may commence, e.g., in response to a timer event occurring during a sleep state of processing unit(s) 216. When electronic device 200 wakes up to a low power level, e.g., in response to the timer, blocks 302, 304, 306 may be executed to configure the security timeout. This can permit electronic device 200 to be ready with an appropriate timeout when a person attempts to unlock electronic device 200.

In some examples, one or more of blocks 302, 304, 306 may be performed based on the availability of signals. For example, sensors 214 of electronic device 200 may provide interrupt signals or data-ready signals to processing unit(s) 216 when new signal values are available. Blocks 302, 304, 306 may then be performed. In an example, when electronic device 200 enters the range of a trusted WI-FI connection, e.g., at an authorized user's home, a network-detected interrupt may occur to cause the authorization level to be recomputed.

In some examples, one or more of blocks 302, 304, 306 may be performed upon receipt of an unlock request or other input via user interface 206. For example, some electronic devices, e.g., some smartphones, when locked, require a user to swipe a finger across a touchscreen to access a PIN-entry screen. The user may then unlock the electronic device by entering an authorized PIN. In some examples, when the swiping motion is detected on the touchscreen, blocks 302, 304, 306 may be performed to update the security timeout to be used upon unlocking of the device.

In various examples, performance of one or more of blocks 302, 304, 306 may be spaced apart in time so that the one or more of blocks 302, 304, 306 are not performed if corresponding one(s) of blocks 302, 304, 306 have been performed within the immediately preceding time period. For example, after block 306 is performed, there may be, e.g., a five-second delay before block 306 may be performed again. This may improve system responsiveness. The electronic device 200 may be configured so that such delays or time periods may be overridden by confidence-locking engine 204 or by abrupt changes in the received signals.

FIG. 4 is a flow diagram that illustrates an example process 400 for configuring an electronic device, e.g., electronic device 200, FIG. 2. Block 402 may represent block 302, FIG. 3.

At block 404, timeout engine 202 may automatically determine respective signal-confidence levels of one or more of the detected signals. In some examples, block 404 may analyze a first collection of one or more of the signals to provide a first one of the signal-confidence levels indicating a level (e.g., a degree or amount) of correspondence of the analyzed signals in the first collection to distinguishing data 226. The distinguishing data 226 may be stored in code, e.g., in one or more module(s) of timeout engine 202, or in data, e.g., in data store 222, FIG. 2. Exemplary functions performed in block 404 are described above with reference to signal-confidence module 242, FIG. 2.

At block 406, timeout engine 202 may determine the authorization confidence level using the determined respective signal-confidence levels from block 404. Block 406 may represent block 304, FIG. 3. Exemplary functions performed in block 406 are described above with reference to level-determining module 236, FIG. 2.

At block 408, timeout engine 202 may configure the electronic device 200 to have a security timeout based at least in part on the authorization confidence level from block 406. Block 408 may represent block 306, FIG. 3.

In various examples, neural networks may be used in performing method(s) described herein. The neural networks may be represented as weights and other neural-network data 228 stored in data store 222. In some of these examples, the method may include block 410, block 412, decision block 414, and block 416. As used herein, "neural networks" may include, e.g., shallow or deep artificial neural networks or multilayer perceptrons. Other machine-learning techniques may be used in addition to or instead of neural networks. In some examples, machine-learning techniques are used to provide or refine distinguishing data 226.

At block 410, timeout engine 202 may apply the one or more of the signals of the first collection to a neural network in order to perform the analyzing discussed above with reference to block 404. The neural network may be based at least in part on the distinguishing data 226. For example, the neural network may be trained using the distinguishing data 226. The first of the signal-confidence levels may be based at least in part on an output of the neural network. The neural network may include data (e.g., artificial-neuron connections and weights) stored in data store 222. The applying may include performing neural-network processing operations by processing unit(s) 216 using the stored data and the one or more of the signals of the first collection applied to the neural network.

At block 412, timeout engine 202 may determine a diagnostic confidence level using one or more of the detected signals other than the one or more of the signals in the first collection. In some examples, the detected signals may include gait signals computed from accelerometer signals, and may include signal(s) indicating the presence of one or more trusted device(s), e.g., BLUETOOTH headsets. The first collection may include the gait signals. The diagnostic confidence level may be determined using the trusted-device-presence signals.

At decision block 414, timeout engine 202 may determine whether the diagnostic confidence level matches a training condition. The training condition may include, e.g., an interval (open, closed, or half-closed) of the diagnostic confidence level. Continuing the example above, the training condition may be a range of values of the diagnostic confidence level determined using the trusted-device-presence signals, that range indicating a sufficiently-high likelihood that an authorized user is in possession of electronic device 200. If the diagnostic confidence level matches the training condition, decision block 414 may be followed by block 416. If the diagnostic confidence level does not match the training condition, process 400 may terminate or decision block 414 may be followed by block 406. In some examples, block 412, decision block 414, and block 416 may be performed in parallel or asynchronously with respect to blocks 404, 406, 408. For example, neural network training at block 416 may be performed when electronic device 200 is locked, using stored signal values from block 402.

At block 416, timeout engine 202 may, in response to the diagnostic confidence level matching a training condition as determined in decision block 414, train the neural network using the one or more of the signals in the first collection. Continuing the example above, when the authorized user is in possession of electronic device 200, as inferred from the trusted-device-presence signals, the gait signals may be determined to correspond to the authorized user and the gait of the authorized user. Accordingly, the neural network data 228 may be adjusted using a training algorithm so that the neural network used in block 410 more effectively distinguishes the authorized user's gait from gaits of other individuals. This permits the neural network to be trained over time during normal use of electronic device 200, reducing the need for an intensive, time-consuming initial training period. In some examples, blocks 412-416, or other machine learning techniques, permit adjusting distinguishing data over time based on interrelationships or correlations between different detected signals. In some examples, blocks corresponding to blocks 410-416 are used to train a neural network to update a stored locking criterion, as discussed below with reference to FIG. 5 and above with reference to confidence-locking engine 204.

In some examples, processing 418 may include any of blocks 404, 406, 410, 412, 414, and 416. Processing 418 may be performed on an electronic device 102(2), e.g., a smartphone. Processing 418 may additionally or alternatively be performed on an electronic device 102(1), e.g., a server. In some examples, block 402 may include transmitting at least some of the detected signals via a network, e.g., using communications interface(s) 230. Block 408 may include receiving an authorization confidence level via the network, the authorization confidence level indicative of whether the electronic device is under the control of an authorized user of the electronic device. In some examples, block 404 may include receiving data of multiple signals via a network, the signals provided from sensors of an electronic device. Block 406 may include transmitting the authorization confidence level via the network. Transmitting detected signals and receiving authorization confidence levels may permit computing authorization confidence levels more rapidly or more accurately, e.g., using electronic device 102(1) having more processing power or storage space than electronic device 102(2). In some examples, electronic device 102(1) may be configured to determine authorization confidence levels using a larger or more capable neural network than electronic device 102(2) is configured to use or would be capable of using due to storage or processing limitations. In some examples, block 404 may include transmitting signal-confidence levels and block 406 may include receiving an authorization confidence level. Transmitting signal-confidence levels may permit using both processes carried out by relatively more powerful electronic device 102(1) and processes carried out by relatively less powerful electronic device 102(2), e.g., accelerometer integration to determine position, to determine the authorization confidence level. Processing to determine signal-confidence levels or authorization confidence levels can be divided between any number of network-connected electronic devices, which may include "cloud" or software-as-a-service ("SaaS") servers. Processes described herein, e.g., with reference to FIGS. 3, 5, 6, and 7 may also be performed by multiple intercommunicating electronic device(s), e.g., exchanging signals, authorization confidence levels, confidence history data, or recommendations.

FIG. 5 is a flow diagram that illustrates an example process 500 for locking a user interface of an electronic device, e.g., electronic device 200, FIG. 2.

At block 502, confidence-locking engine 204 (or detecting module 234 in timeout engine 202) may detect a collection of signals using one or more sensors 214 of an electronic device 200. As noted above, additional signals or collections of signals may be detected but not undergo the below-described processing. Block 502 may include processing described above with reference to detecting module 234 or confidence-locking detecting module 250.

At block 504, confidence-locking engine 204 updates a confidence history using the detected collection of signals from block 502. Block 504 may include processing described above with reference to updating module 246.

At decision block 506, confidence-locking engine 204 may determine whether the confidence history matches a stored locking condition. The locking condition may be stored in code, e.g., in confidence-locking module 248, or in data, e.g., in data store 222. Locking conditions may be as described above with reference to confidence-locking module 248.

At block 508, in response to a match of the confidence history to the locking condition, confidence-locking engine 204 locks user interface 206 of the electronic device 200. Blocks 506 and 508 may include processing described above with reference to confidence-locking module 248.

Blocks 506 or 508 may be followed by block 502. In this way, collections of signals may be repeatedly detected and the confidence history updated using each of the collections of signals. Blocks 502-508 may be executed continually, periodically, or intermittently. Blocks 502, or 504, or decision block 506, may be executed on a coprocessor that wakes a main processor in the event of a match of the confidence history to the locking condition, e.g., as described above with reference to signal-confidence module 242, FIG. 2.

FIG. 6 is a flow diagram that illustrates an example process 600 for locking a user interface of an electronic device, e.g., electronic device 200, FIG. 2. Block 602 may represent block 502, FIG. 5. Block 602 may be followed by blocks 604, 608, or 614. Blocks 604, 606, 608, 610, 612, and 614 may represent components or substeps of block 504, FIG. 5.

In some examples, at block 604, confidence-locking engine 204 may determine an authorization confidence level using the collection of signals. This may be as described above with reference to updating module 246.

At block 606, confidence-locking engine 204 may update the confidence history using the determined authorization confidence level from block 604, as noted above with reference to updating module 246, FIG. 2, and to block 504, FIG. 5.

In some examples, at block 608, confidence-locking engine 204 may determine a respective signal-confidence level for each signal in each of the collections of signals. Block 608 may include processing described above with reference to signal-confidence module 242.

At block 610, confidence-locking engine 204 may determine a respective aggregate confidence level for each of the collections of signals using the corresponding signal-confidence levels. Block 610 may include processing described above with reference to level-determining module 236.

At block 612, confidence-locking engine 204 may update the confidence history using each aggregate confidence level. Block 612 may include processing described above with reference to updating module 246.

In some examples, at block 614, confidence-locking engine 204 may store, e.g., in the confidence history, historical data of at least some of the signals using each of the collections of signals. The historical data may also or alternatively be stored in a different repository from the confidence history. Block 614 may include functions described above with reference to updating module 246, FIG. 2.

Blocks 606, 612, or 614 may be followed by decision block 616. Decision block 616 may represent decision block 506, FIG. 5. Block 618 may represent block 508, FIG. 5. In these examples, at decision block 616, confidence-locking engine 204 may determine whether the stored historical data match the stored locking condition. The stored locking condition may identify, e.g., theft or other loss of possession. Blocks 616 or 618 may be followed by block 602, e.g., as noted above with reference to FIG. 5. In this way, multiple collections of signals can be detected and the confidence history correspondingly updated.

Figure 7:
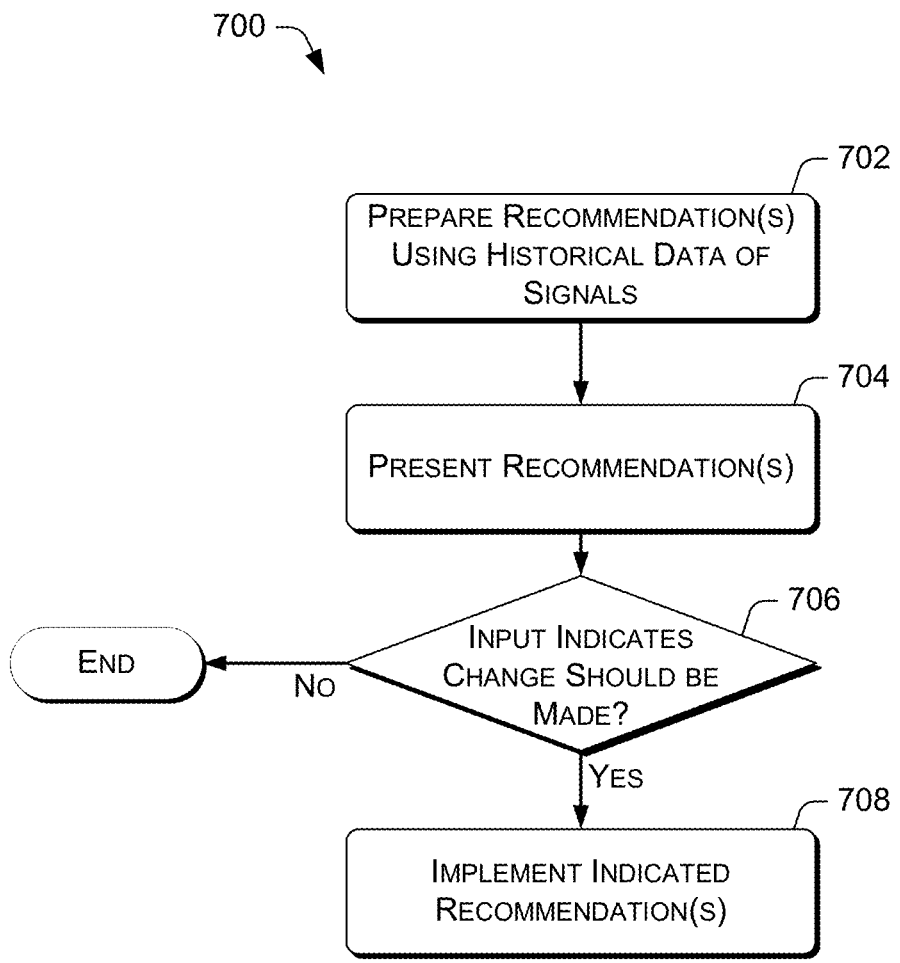
FIG. 7 is a flow diagram that illustrates an example process for configuring a security timeout of an electronic device according to various examples described herein.

FIG. 7 is a flow diagram that illustrates an example process 700 for configuring a security timeout of an electronic device, e.g., electronic device 200, FIG. 2.

At block 702, recommendation(s) are prepared using historical data of signals. The historical data may include historical data stored at block 614, FIG. 6. In an example, the system may detect that the owner mostly uses the electronic device in low-light conditions, e.g., when in bed at night. The recommendation for this example may be that voice and WI-FI signals should be weighted more heavily in determining authorization confidence levels than are face-recognition images or other signals using fine detail in visual data for this system for this user.

At block 704, the recommendations are presented, e.g., via user interface 206 of electronic device 200. In some examples, a summary of the data leading to the recommendation may also be presented.

At block 706, input is received, e.g., from a user via the user interface 206. If the input indicates no change should be made, the process may terminate. If the input indicates a change should be made, the next block is block 708. In some examples, the input may indicate that a default authentication level should be used. In some examples, block 704 includes presenting a graphical user interface dialog box including the recommendation and three graphical buttons for Accept, Decline, and Use Default. In these examples, block 706 includes receiving data indicating one of the graphical buttons was selected.

At block 708, recommendation(s) indicated in the input as being desirable, e.g., to the user, are implemented. Block 708 may include storing data corresponding to the recommendation(s) in distinguishing data 226, neural network data 228, or other elements of data store 222. In some examples, in response to selection of a "Use Default" function, default data may be stored in data store 222 in place of the data corresponding to the recommendation.

Various examples described above relate to adjusting locking timeouts or to locking devices based on detected signals. In various examples, electronic device 200 may be configured to adjust other security-related parameters based on the detected signals. For example, if the authorization confidence level is below a threshold, electronic device 200 may require two-factor authentication, e.g., an RSA SECURID tag and password. If the authorization confidence level is above the threshold, electronic device 200 may require only one-factor authentication, e.g., a password. A technical effect of various examples is to adjust operation of electronic device 200 based at least partly on measured data of characteristics of the physical environment around electronic device 200. Another technical effect of various examples is to present, on an electronic display, a visual representation of the current security timeout or trust level or other elements of the internal state of electronic device 200.

Example Clauses

A: A method, comprising: detecting multiple signals using one or more sensors of an electronic device; automatically determining an authorization confidence level using the detected signals, the authorization confidence level indicative of whether the electronic device is under the control of an authorized user, or one of a plurality of authorized users, of the electronic device; and configuring the electronic device to have a security timeout based at least in part on the authorization confidence level.

B: The method as paragraph A recites, the sensors including at least one of a network transceiver, a motion sensor, a proximity detector, a light sensor, a still imager, a video imager, a microphone, a fingerprint reader, a retinal scanner, an iris scanner, or a touchscreen.

C: The method as paragraph A or B recites, further including automatically determining respective signal-confidence levels of one or more of the detected signals, wherein the authorization confidence level is determined using the determined respective signal-confidence levels.

D: The method as paragraph C recites, the determining respective signal-confidence levels further including analyzing a first collection of one or more of the signals to provide a first one of the signal-confidence levels indicating a level of correspondence of the analyzed signals to distinguishing data of the authorized user, or to distinguishing data of the plurality of authorized users or of one or more of the plurality of authorized users.

E: The method as paragraph D recites, the analyzing including applying the one or more of the signals of the first collection to a neural network based at least in part on the distinguishing data, wherein the first of the signal-confidence levels is based at least in part on an output of the neural network.

F: The method as paragraph E recites, further including: determining a diagnostic confidence level using one or more of the detected signals other than the one or more of the signals in the first collection; and in response to the diagnostic confidence level matching a training condition, training the neural network using the one or more of the signals in the first collection.

G: The method as any of paragraphs A-F recites, the configuring including disabling the security timeout in response to the determined authorization confidence level matching a selected confidence condition.

H: A device comprising: a user interface; one or more sensors; one or more processing units operably coupled to the sensors and the user interface; and one or more computer-readable media, e.g., computer storage media, storing distinguishing data of an authorized user of the device, or of a plurality of authorized users, or of one or more of the plurality of authorized users, the computer-readable media further storing instructions that, when executed by the one or more processing units, cause the one or more processing units to perform operations comprising: detecting multiple signals using the one or more sensors; determining an authorization confidence level of the detected signals based at least in part on the distinguishing data, the authorization confidence level indicative of whether the electronic device is under the control of the authorized user of the electronic device; determining a time period using the determined authorization confidence level; and locking the user interface in response to inactivity of the user interface for the determined time period.

I: The device as paragraph H recites, the sensors including at least one of a network transceiver, a motion sensor, a proximity detector, a light sensor, a still imager, a video imager, a microphone, a fingerprint reader, a retinal scanner, an iris scanner, or a touchscreen.

J: The device as paragraph H or I recites, the user interface including at least one of the sensors.

K: The device as paragraph J recites, the at least one of the sensors included in the user interface comprising a touchscreen.

L: The device as any of paragraphs H-K recites, the one or more processing units including a first processing unit and a second processing unit; the second processing unit configured to perform the locking the user interface; and the computer-readable media further storing instructions that, when executed by the first processing unit, cause the first processing unit to perform second operations comprising: determining a signal-confidence level based at least in part on a first collection of one or more of the detected signals; determining that the signal-confidence level matches a stored condition; and in response to the matching the stored condition, waking the second processing unit from a sleep state.

M: The device as any of paragraphs H-L recites, the sensors including a network transceiver and the multiple signals including a remote-device confidence signal, the operations further including one or more of: receiving the remote-device confidence signal via the network transceiver, determining the authorization confidence level based at least in part on the remote-device confidence signal, or determining the authorization confidence level based solely on the remote-device confidence signal.

N: The device as any of paragraphs H-M recites, further including a network transceiver, the operations further including transmitting the determined authorization confidence level via the network transceiver.

O: A method, comprising: detecting a collection of signals using one or more sensors of an electronic device; updating a confidence history using the collection of signals; and in response to a match of the confidence history to a stored locking condition, locking a user interface of the electronic device.

P: The method as paragraph O recites, the updating including storing, in the confidence history, values of at least some of the signals in the collection of signals.

Q: The method as paragraph P recites, the at least some of the signals including motion signals and grip signals indicative of whether a left hand or a right hand is gripping the electronic device, and the locking condition including motion out of a left hand and into a left hand, or out of a right hand and into a right hand.

R: The method as paragraph P or Q recites, the at least some of the signals including acceleration signals and the locking condition including a change in acceleration having a magnitude exceeding a selected threshold.

S: The method as any of paragraphs O-R recites, further including repeating the detecting and updating for each of a plurality of collections of the signals, the updating including determining a respective authorization confidence level using each of the collection of signals, the confidence history including an average of the determined respective authorization confidence levels, and the locking condition including an interval of values of the average.

T: The method as any of paragraphs O-S recites, further including repeating the detecting and updating for each of a plurality of collections of the signals, the updating including determining a respective signal-confidence level for each signal in each of the collections of signals, determining an aggregate confidence level for each of the collections of signals using the corresponding signal-confidence levels, and updating the confidence history using each of the aggregate confidence levels.

U: A system comprising: one or more sensors; one or more processing units coupled to the sensors; and one or more computer-readable media, e.g., computer storage media, coupled to the processing units and storing instructions that, when executed by the one or more processing units, cause one or more processing units to perform operations as any of paragraphs A-G recites.

V: A computer-readable medium having thereon computer-executable instructions, the computer-executable instructions upon execution configuring a computer to perform operations as any of paragraphs A-G recites.

W: A computer-readable medium having thereon computer-executable instructions, the computer-executable instructions upon execution configuring a computer to perform operations as any of paragraphs H-N recites.

X: A system comprising: one or more sensors; one or more processing units coupled to the sensors; and one or more computer-readable media, e.g., computer storage media, coupled to the processing units and storing instructions that, when executed by the one or more processing units, cause one or more processing units to perform operations as any of paragraphs O-T recites.

Y: A computer-readable medium having thereon computer-executable instructions, the computer-executable instructions upon execution configuring a computer to perform operations as any of paragraphs O-T recites.

Z: A system, comprising: means for detecting multiple signals using one or more sensors of an electronic device; means for automatically determining an authorization confidence level using the detected signals, the authorization confidence level indicative of whether the electronic device is under the control of an authorized user, or one of a plurality of authorized users, of the electronic device; and means for configuring the electronic device to have a security timeout based at least in part on the authorization confidence level.

AA: The system as paragraph Z recites, the sensors including at least one of a network transceiver, a motion sensor, a proximity detector, a light sensor, a still imager, a video imager, a microphone, a fingerprint reader, a retinal scanner, an iris scanner, or a touchscreen.

AB: The system as paragraph Z or AA recites, further including means for automatically determining respective signal-confidence levels of one or more of the detected signals, the means for determining the authorization confidence level configured to determine the authorization confidence level using the determined respective signal-confidence levels.

AC: The system as paragraph AB recites, the means for determining respective signal-confidence levels further including means for analyzing a first collection of one or more of the signals to provide a first one of the signal-confidence levels indicating a level of correspondence of the analyzed signals to distinguishing data of the authorized user, or to distinguishing data of the plurality of authorized users or of one or more of the plurality of authorized users.

AD: The system as paragraph AC recites, the means for analyzing including means for applying the one or more of the signals of the first collection to a neural network based at least in part on the distinguishing data, wherein the first of the signal-confidence levels is based at least in part on an output of the neural network.

AE: The system as paragraph AD recites, further including: means for determining a diagnostic confidence level using one or more of the detected signals other than the one or more of the signals in the first collection; and means for, in response to the diagnostic confidence level matching a training condition, training the neural network using the one or more of the signals in the first collection.

AF: The system as any of paragraphs Z-AE recites, the means for configuring including means for disabling the security timeout in response to the determined authorization confidence level matching a selected confidence condition.

AG: A system, comprising: means for detecting a collection of signals using one or more sensors of an electronic device; means for updating a confidence history using the collection of signals; and means for, in response to a match of the confidence history to a stored locking condition, locking a user interface of the electronic device.

AH: The system as paragraph AG recites, the means for updating including means for storing, in the confidence history, values of at least some of the signals in the collection of signals.

AI: The system as paragraph AH recites, the at least some of the signals including motion signals and grip signals indicative of whether a left hand or a right hand is gripping the electronic device, and the locking condition including motion out of a left hand and into a left hand, or out of a right hand and into a right hand.

AJ: The system as paragraph AH or AI recites, the at least some of the signals including acceleration signals and the locking condition including a change in acceleration having a magnitude exceeding a selected threshold.

AK: The system as any of paragraphs AG-AJ recites, further including means for repeating the detecting and updating for each of a plurality of collections of the signals, the means for updating including means for determining a respective authorization confidence level using each of the collection of signals, the confidence history including an average of the determined respective authorization confidence levels, and the locking condition including an interval of values of the average.

AL: The system as any of paragraphs AG-AK recites, further including means for repeating the detecting and updating for each of a plurality of collections of the signals, the means for updating including determining a respective signal-confidence level for each signal in each of the collections of signals, means for determining an aggregate confidence level for each of the collections of signals using the corresponding signal-confidence levels, and means for updating the confidence history using each of the aggregate confidence levels.

AM: A method, comprising: preparing recommendation(s) using historical data of signals; presenting the recommendations, e.g., via a user interface of an electronic device, and optionally presenting a summary of the data leading to the recommendation; receiving input indicating one or more of: changes should be made (recommendations should be adopted), changes should not be made, or default values should be used; and implementing recommendation(s) indicated in the input as being desirable, e.g., to the user AN: The method as paragraph AM recites, further including storing data corresponding to the recommendation(s) in distinguishing data, neural network data, or other elements of a data store or another computer-readable medium.

AO: The method as paragraph AM or AN recites, further including, in response to selection of a "Use Default" function, storing default data in the data store in place of the data corresponding to the recommendation.

AP: A system comprising: one or more sensors; one or more processing units coupled to the sensors; and one or more computer-readable media, e.g., computer storage media, coupled to the processing units and storing instructions that, when executed by the one or more processing units, cause one or more processing units to perform operations as any of paragraphs AM-AO recites.

AQ: A computer-readable medium having thereon computer-executable instructions, the computer-executable instructions upon execution configuring a computer to perform operations as any of paragraphs AM-AO recites.

AR: A system, comprising: means for preparing recommendation(s) using historical data of signals; means for presenting the recommendations, e.g., via a user interface of an electronic device, and optionally for presenting a summary of the data leading to the recommendation; means for receiving input indicating one or more of: changes should be made (recommendations should be adopted), changes should not be made, or default values should be used; and means for implementing recommendation(s) indicated in the input as being desirable, e.g., to the user.

AS: The system as paragraph AR recites, further including means for storing data corresponding to the recommendation(s) in distinguishing data, neural network data, or other elements of a data store or another computer-readable medium.

AT: The system as paragraph AR or AS recites, further including, in response to selection of a "Use Default" function, storing default data in the data store in place of the data corresponding to the recommendation.

AU: A method, comprising: detecting multiple signals using one or more sensors of an electronic device; transmitting at least some of the signals via a network; receiving an authorization confidence level via the network, the authorization confidence level indicative of whether the electronic device is under the control of an authorized user of the electronic device; and configuring the electronic device to have a security timeout based at least in part on the authorization confidence level.

AV: A method comprising: receiving data of multiple signals via a network, the signals provided from sensors of an electronic device; automatically determining an authorization confidence level using the received signals, the authorization confidence level indicative of whether the electronic device is under the control of an authorized user of the electronic device; and transmitting the authorization confidence level via the network.

AW: A computer-readable medium having thereon computer-executable instructions, the computer-executable instructions upon execution configuring a computer to perform operations as paragraph AU recites.

AX: A system, comprising: means for detecting multiple signals using one or more sensors of an electronic device; means for transmitting at least some of the signals via a network; means for receiving an authorization confidence level via the network, the authorization confidence level indicative of whether the electronic device is under the control of an authorized user of the electronic device; and means for configuring the electronic device to have a security timeout based at least in part on the authorization confidence level.

AY: A computer-readable medium having thereon computer-executable instructions, the computer-executable instructions upon execution configuring a computer to perform operations as paragraph AV recites.

AZ: A system, comprising: means for receiving data of multiple signals via a network, the signals provided from sensors of an electronic device; means for automatically determining an authorization confidence level using the received signals, the authorization confidence level indicative of whether the electronic device is under the control of an authorized user of the electronic device; and means for transmitting the authorization confidence level via the network

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described processes. The described processes may be performed by resources associated with one or more electronic device(s) 102, 200 such as one or more internal or external CPUs or GPUs, and/or one or more pieces of hardware logic such as FPGAs, DSPs, or other types described above.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method, comprising:
    detecting multiple signals using one or more sensors of an electronic device;
    automatically determining an authorization confidence level using the detected signals, the authorization confidence level indicative of whether the electronic device is under the control of an authorized user of the electronic device; and
    configuring the electronic device to have a security timeout based at least in part on the authorization confidence level.

2. The method as claim 1 recites, the sensors including at least one of a network transceiver, a motion sensor, a proximity detector, a light sensor, a still imager, a video imager, a microphone, a fingerprint reader, a retinal scanner, an iris scanner, or a touchscreen.

3. The method as claim 1 recites, further including automatically determining respective signal-confidence levels of one or more of the detected signals, wherein the authorization confidence level is determined using the determined respective signal-confidence levels.

4. The method as claim 3 recites, the determining respective signal-confidence levels further including analyzing a first collection of one or more of the signals to provide a first one of the signal-confidence levels indicating a level of correspondence of the analyzed signals to distinguishing data of the authorized user.

5. The method as claim 4 recites, the analyzing including applying the one or more of the signals of the first collection to a neural network based at least in part on the distinguishing data, wherein the first of the signal-confidence levels is based at least in part on an output of the neural network.

6. The method as claim 5 recites, further including:
    determining a diagnostic confidence level using one or more of the detected signals other than the one or more of the signals in the first collection; and
    in response to the diagnostic confidence level matching a training condition, training the neural network using the one or more of the signals in the first collection.

7. The method as claim 1 recites, the configuring including disabling the security timeout in response to the determined authorization confidence level matching a selected confidence condition.

8. A device comprising:
    a user interface;
    one or more sensors;
    one or more processing units operably coupled to the sensors and the user interface; and
    one or more computer storage media storing distinguishing data of an authorized user of the device, the computer storage media further storing instructions that, when executed by the one or more processing units, cause the one or more processing units to perform operations comprising:
        detecting multiple signals using the one or more sensors;
        determining an authorization confidence level of the detected signals based at least in part on the distinguishing data, the authorization confidence level indicative of whether the electronic device is under the control of the authorized user of the electronic device;
        determining a time period using the determined authorization confidence level; and
        locking the user interface in response to inactivity of the user interface for the determined time period.

9. The device as claim 8 recites, the sensors including at least one of a network transceiver, a motion sensor, a proximity detector, a light sensor, a still imager, a video imager, a microphone, a fingerprint reader, a retinal scanner, an iris scanner, or a touchscreen.

10. The device as claim 8 recites, the user interface including at least one of the sensors.

11. The device as claim 10 recites, the at least one of the sensors included in the user interface comprising a touchscreen.

12. The device as claim 8 recites,
    the one or more processing units including a first processing unit and a second processing unit;
    the second processing unit configured to perform the locking the user interface; and
    the computer storage media further storing instructions that, when executed by the first processing unit, cause the first processing unit to perform second operations comprising:
        determining a signal-confidence level based at least in part on a first collection of one or more of the detected signals;

determining that the signal-confidence level matches a stored condition; and in response to the matching the stored condition, waking the second processing unit from a sleep state.

13. The device as claim 8 recites, the sensors including a network transceiver and the multiple signals including a remote-device confidence signal, the operations further including receiving the remote-device confidence signal via the network transceiver.

14. The device as claim 8 recites, further including a network transceiver, the operations further including transmitting the determined authorization confidence level via the network transceiver.

15. A method, comprising:
   detecting a collection of signals using one or more sensors of an electronic device;
   updating a confidence history using the collection of signals; and
in response to a match of the confidence history to a stored locking condition, locking a user interface of the electronic device.

16. The method as claim 15 recites, the updating including storing, in the confidence history, values of at least some of the signals in the collection of signals.

17. The method as claim 16 recites, the at least some of the signals including motion signals and grip signals indicative of whether a left hand or a right hand is gripping the electronic device, and the locking condition including motion out of a left hand and into a left hand, or out of a right hand and into a right hand.

18. The method as claim 16 recites, the at least some of the signals including acceleration signals and the locking condition including a change in acceleration having a magnitude exceeding a selected threshold.

19. The method as claim 15 recites, further including repeating the detecting and updating for each of a plurality of collections of the signals, the updating including determining a respective authorization confidence level using each of the collection of signals, the confidence history including an average of the determined respective authorization confidence levels, and the locking condition including an interval of values of the average.

20. The method as claim 15 recites, further including repeating the detecting and updating for each of a plurality of collections of the signals, the updating including determining a respective signal-confidence level for each signal in each of the collections of signals, determining an aggregate confidence level for each of the collections of signals using the corresponding signal-confidence levels, and updating the confidence history using each of the aggregate confidence levels.

* * * * *